United States Patent
Taherzadeh Boroujeni et al.

(10) Patent No.: US 12,414,153 B2
(45) Date of Patent: Sep. 9, 2025

(54) INVOKING AN ACTIVITY STATE OF A RADIO RESOURCE CONTROL CONNECTION SETUP MESSAGE MONITORING PROCEDURE

(71) Applicant: QUALCOMM Incorporated, San Diego, CA (US)

(72) Inventors: Mahmoud Taherzadeh Boroujeni, San Diego, CA (US); Gokul Sridharan, Sunnyvale, CA (US); Hung Dinh Ly, San Diego, CA (US); Peter Gaal, San Diego, CA (US); Tao Luo, San Diego, CA (US); Junyi Li, Fairless Hills, PA (US); Jelena Damnjanovic, Del Mar, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 658 days.

(21) Appl. No.: 17/663,335

(22) Filed: May 13, 2022

(65) Prior Publication Data
US 2022/0369364 A1  Nov. 17, 2022

Related U.S. Application Data

(60) Provisional application No. 63/201,875, filed on May 17, 2021.

(51) Int. Cl.
*H04W 74/00* (2009.01)
*H04L 1/1829* (2023.01)
*H04L 25/02* (2006.01)
*H04W 74/08* (2024.01)
*H04W 74/0833* (2024.01)

(52) U.S. Cl.
CPC ......... *H04W 74/006* (2013.01); *H04L 1/1829* (2013.01); *H04L 25/0224* (2013.01); *H04W 74/0833* (2013.01)

(58) Field of Classification Search
CPC .. H04W 74/0833; H04W 76/27; H04W 48/10
See application file for complete search history.

(56) References Cited

U.S. PATENT DOCUMENTS

| | | | |
|---|---|---|---|
| 2020/0367290 A1* | 11/2020 | Mazloum | H04L 47/283 |
| 2021/0051707 A1* | 2/2021 | Rastegardoost | H04W 72/23 |
| 2022/0039140 A1* | 2/2022 | Yi | H04L 1/08 |
| 2022/0386243 A1* | 12/2022 | Liang | H04W 72/569 |

* cited by examiner

*Primary Examiner* — Romani Ohri
(74) *Attorney, Agent, or Firm* — Harrity & Harrity, LLP

(57) ABSTRACT

Various aspects of the present disclosure generally relate to wireless communication. In some aspects, a user equipment (UE) may determine a status of a repetition procedure associated with a radio resource control (RRC) connection request message of a four-step random access channel (RACH) procedure. The UE may invoke an activity state of an RRC connection setup message monitoring procedure based at least in part on the status of the repetition procedure. Numerous other aspects are described.

30 Claims, 9 Drawing Sheets

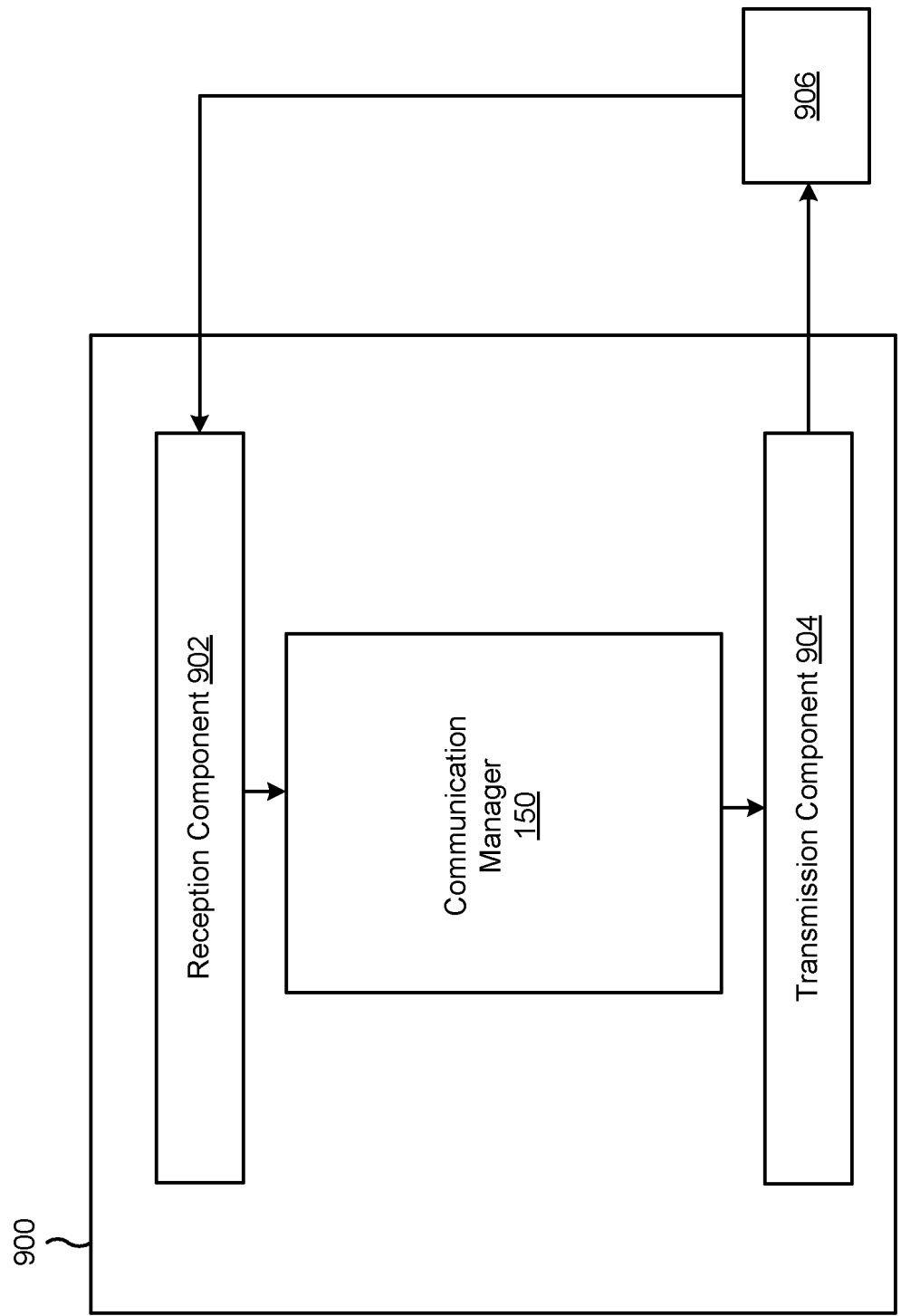

INVOKING AN ACTIVITY STATE OF A RADIO RESOURCE CONTROL CONNECTION SETUP MESSAGE MONITORING PROCEDURE

CROSS-REFERENCE TO RELATED APPLICATION

This Patent Application claims priority to U.S. Provisional Patent Application No. 63/201,875, filed on May 17, 2021, entitled "INVOKING AN ACTIVITY STATE OF A RADIO RESOURCE CONTROL CONNECTION SETUP MESSAGE MONITORING PROCEDURE," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for invoking an activity state of a radio resource control connection setup message physical downlink control channel monitoring procedure.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory; and one or more processors, coupled to the memory, configured to: determine a status of a repetition procedure associated with a radio resource control (RRC) connection request message of a four-step random access channel (RACH) procedure; and invoke an activity state of an RRC connection setup message physical downlink control channel (PDCCH) monitoring procedure based at least in part on the status of the repetition procedure.

In some aspects, a network node for wireless communication includes a memory; and one or more processors, coupled to the memory, configured to: transmit an indication of an activity state invocation parameter that comprises an indication to invoke an activity state of an RRC connection setup message PDCCH monitoring procedure based at least in part on a status of a repetition procedure associated with an RRC connection request message of a four-step RACH procedure; and receive one or more RRC connection request message repetitions.

In some aspects, a method of wireless communication performed by a UE includes determining a status of a repetition procedure associated with an RRC connection request message of a four-step RACH procedure; and invoking an activity state of an RRC connection setup message PDCCH monitoring procedure based at least in part on the status of the repetition procedure.

In some aspects, a method of wireless communication performed by a network node includes transmitting an indication of an activity state invocation parameter that comprises an indication to invoke an activity state of an RRC connection setup message PDCCH monitoring procedure based at least in part on a status of a repetition procedure associated with an RRC connection request message of a four-step RACH procedure; and receiving one or more RRC connection request message repetitions.

In some aspects, a non-transitory computer-readable medium storing a set of instructions for wireless communication includes one or more instructions that, when executed by one or more processors of a UE, cause the UE to: determine a status of a repetition procedure associated with an RRC connection request message of a four-step RACH procedure; and invoke an activity state of an RRC connection setup message PDCCH monitoring procedure based at least in part on the status of the repetition procedure.

In some aspects, a non-transitory computer-readable medium storing a set of instructions for wireless communication includes one or more instructions that, when executed by one or more processors of a network node, cause the network node to: transmit an indication of an activity state invocation parameter that comprises an indication to invoke an activity state of an RRC connection setup message PDCCH monitoring procedure based at least in part on a status of a repetition procedure associated with an RRC connection request message of a four-step RACH procedure; and receive one or more RRC connection request message repetitions.

In some aspects, an apparatus for wireless communication includes means for determining a status of a repetition procedure associated with an RRC connection request message of a four-step RACH procedure; and means for invoking an activity state of an RRC connection setup message PDCCH monitoring procedure based at least in part on the status of the repetition procedure.

In some aspects, an apparatus for wireless communication includes means for transmitting an indication of an activity state invocation parameter that comprises an indication to invoke an activity state of an RRC connection setup message PDCCH monitoring procedure based at least in part on a status of a repetition procedure associated with an RRC connection request message of a four-step RACH procedure; and means for receiving one or more RRC connection request message repetitions.

Aspects generally include a method, apparatus, system, computer program product, non-transitory computer-readable medium, user equipment, network node, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 8 and 9 are block diagrams of example apparatuses for wireless communication, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
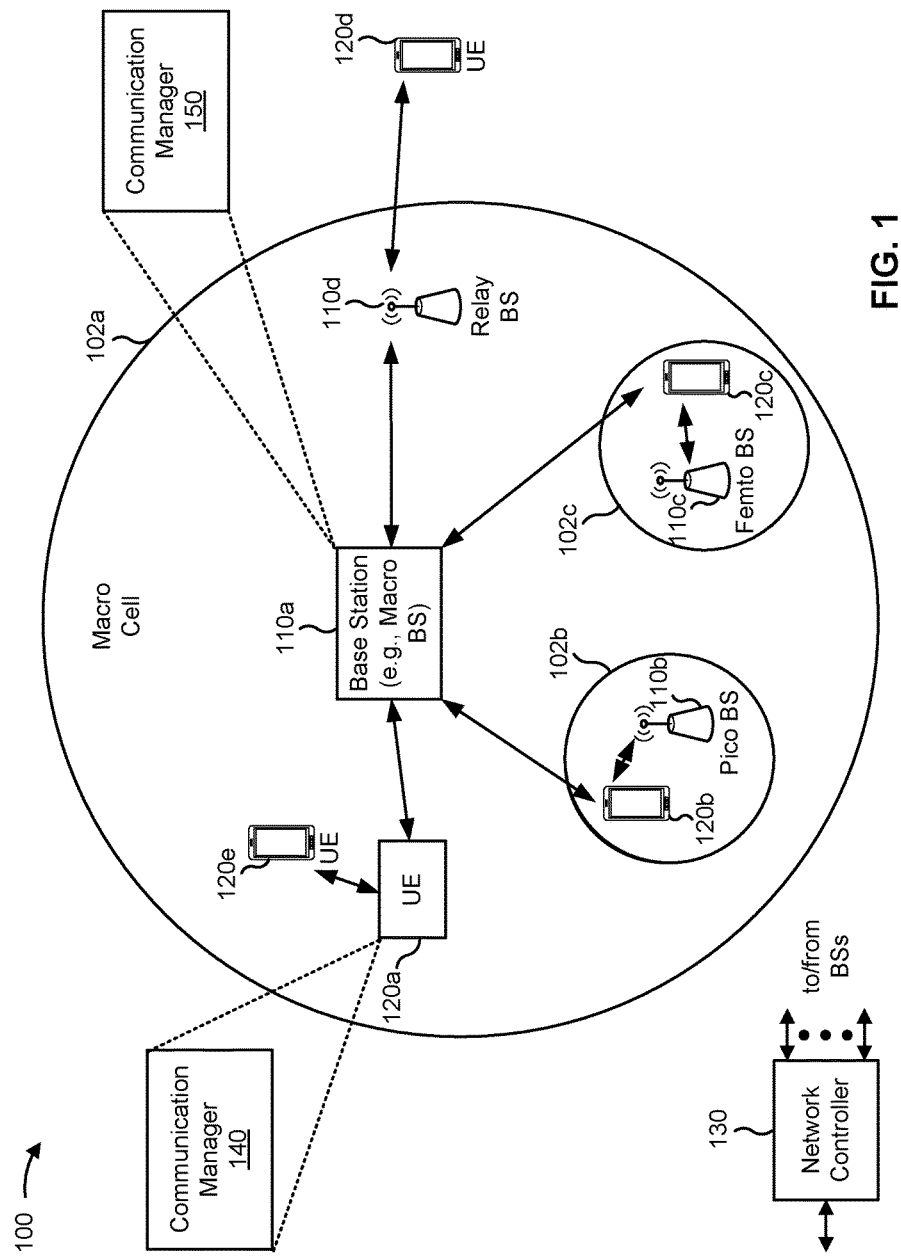
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As described herein, a network node, which may be referred to as a "node," a "network node," or a "wireless node," may be a base station (e.g., base station 110), a UE (e.g., UE 120), a relay device, a network controller, an apparatus, a device, a computing system, one or more components of any of these, and/or another processing entity configured to perform one or more aspects of the techniques described herein. For example, a network node may be a UE. As another example, a network node may be a base station. A network node may be an aggregated base station and/or one or more components of a disaggregated base station. As an example, a first network node may be configured to communicate with a second network node or a third network node. The adjectives "first," "second," "third," and so on are used for contextual distinction between two or more of the modified noun in connection with a discussion and are not meant to be absolute modifiers that apply only to a certain respective node throughout the entire document. For example, a network node may be referred to as a "first network node" in connection with one discussion and may be referred to as a "second network node" in connection with another discussion, or vice versa. Reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE being configured to receive information from a base station also discloses a first network node being configured to receive information from a second network node, "first network node" may refer to a first UE, a first base station, a first apparatus, a first device, a first computing system, a first one or more components, a first processing entity, or the like configured to receive the information from the second network; and "second network node" may refer to a second UE, a second base station, a second apparatus, a second device, a second computing system, a second one or more components, a second processing entity, or the like.

In some aspects, the UE 120 may include a communication manager 140. As described in more detail elsewhere herein, the communication manager 140 may determine a status of a repetition procedure associated with a radio resource control (RRC) connection request message of a four-step random access channel (RACH) procedure; and invoke an activity state of an RRC connection setup message physical downlink control channel (PDCCH) monitoring procedure based at least in part on the status of the repetition procedure. Additionally, or alternatively, the communication manager 140 may perform one or more other operations described herein.

In some aspects, the network node may include a communication manager 150. As described in more detail elsewhere herein, the communication manager 150 may transmit an indication of an activity state invocation parameter that comprises an indication to invoke an activity state of an RRC connection setup message PDCCH monitoring procedure based at least in part on a status of a repetition procedure associated with an RRC connection request message of a four-step RACH procedure; and receive one or more RRC connection request message repetitions. Additionally, or alternatively, the communication manager 150 may perform one or more other operations described herein.

As indicated above, FIG. 1 is provided as an example. Other examples may differ from what is described with regard to FIG. 1.

Figure 2:
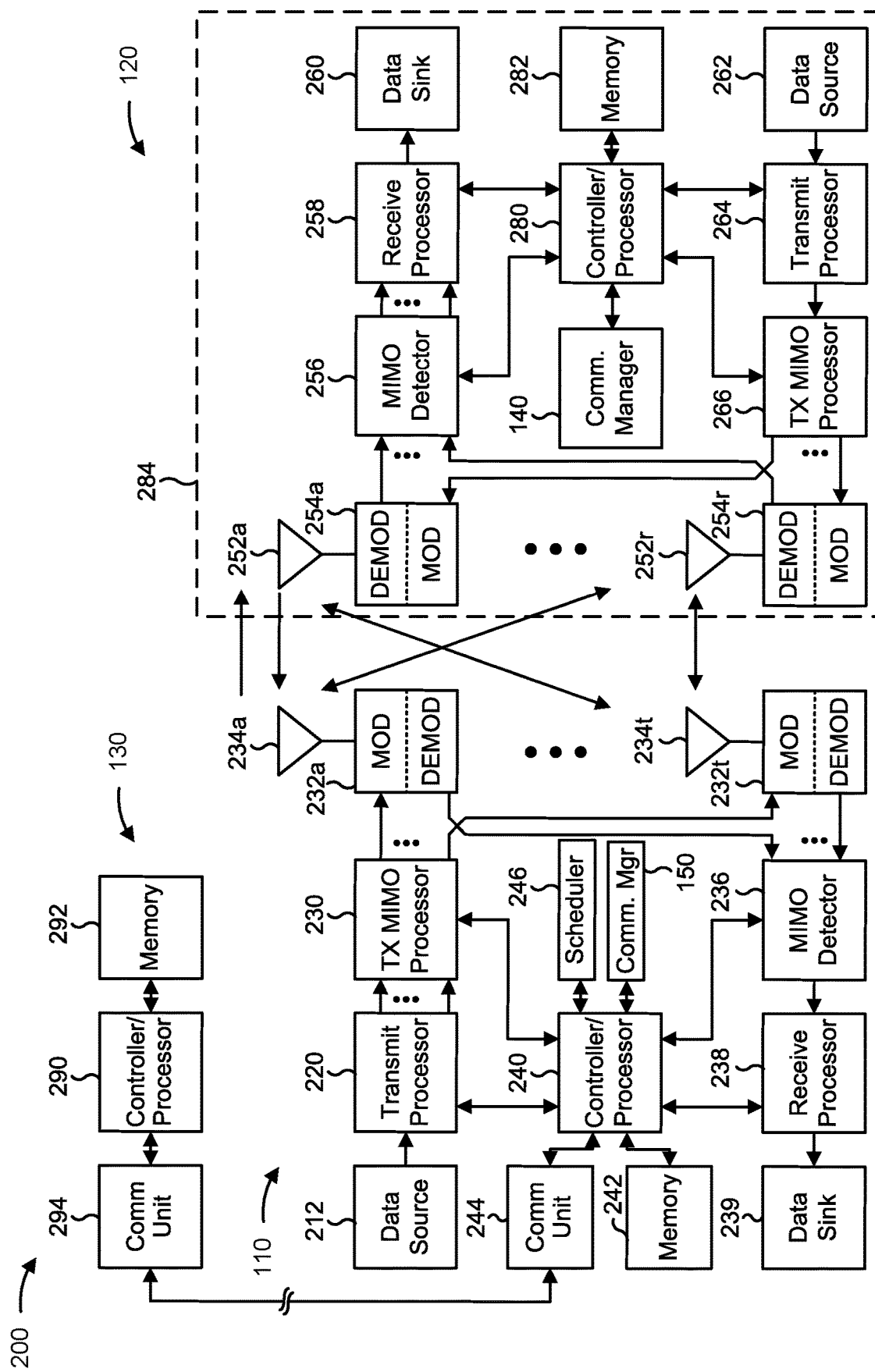
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

In some aspects, the term "base station" (e.g., the base station 110), "network node," or "network entity" may refer to an aggregated base station, a disaggregated base station, an integrated access and backhaul (IAB) node, a relay node, and/or one or more components thereof. For example, in some aspects, "base station," "network node," or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station," "network node," or "network entity" may refer to one device configured to perform one or more functions, such as those described herein in connection with the base station 110. In some aspects, the term "base station," "network node," or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station," "network node," or "network entity" may refer to any one or more of those different devices. In some aspects, the term "base station," "network node," or "network entity" may refer to one or more virtual base stations and/or one or more virtual base station functions. For example, in some aspects, two or more base station functions may be instantiated on a single device. In some aspects, the term "base station," "network node," or "network entity" may refer to one of the base station functions and not another. In this way, a single device may include more than one base station.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-9).

The controller/processor 240 of the base station 110, the controller/processor 280 of the UE 120, and/or any other component(s) of FIG. 2 may perform one or more techniques associated with invoking an activity state of an RRC connection setup message PDCCH monitoring procedure, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, the UE includes means for determining a status of a repetition procedure associated with an RRC connection request message of a four-step RACH procedure; and/or means for invoking an activity state of an RRC connection setup message PDCCH monitoring procedure based at least in part on the status of the repetition procedure. The means for the UE to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

In some aspects, the network node includes means for transmitting an indication of an activity state invocation parameter that comprises an indication to invoke an activity state of an RRC connection setup message PDCCH monitoring procedure based at least in part on a status of a repetition procedure associated with an RRC connection request message of a four-step RACH procedure; and/or means for receiving one or more RRC connection request message repetitions. The means for the network node to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
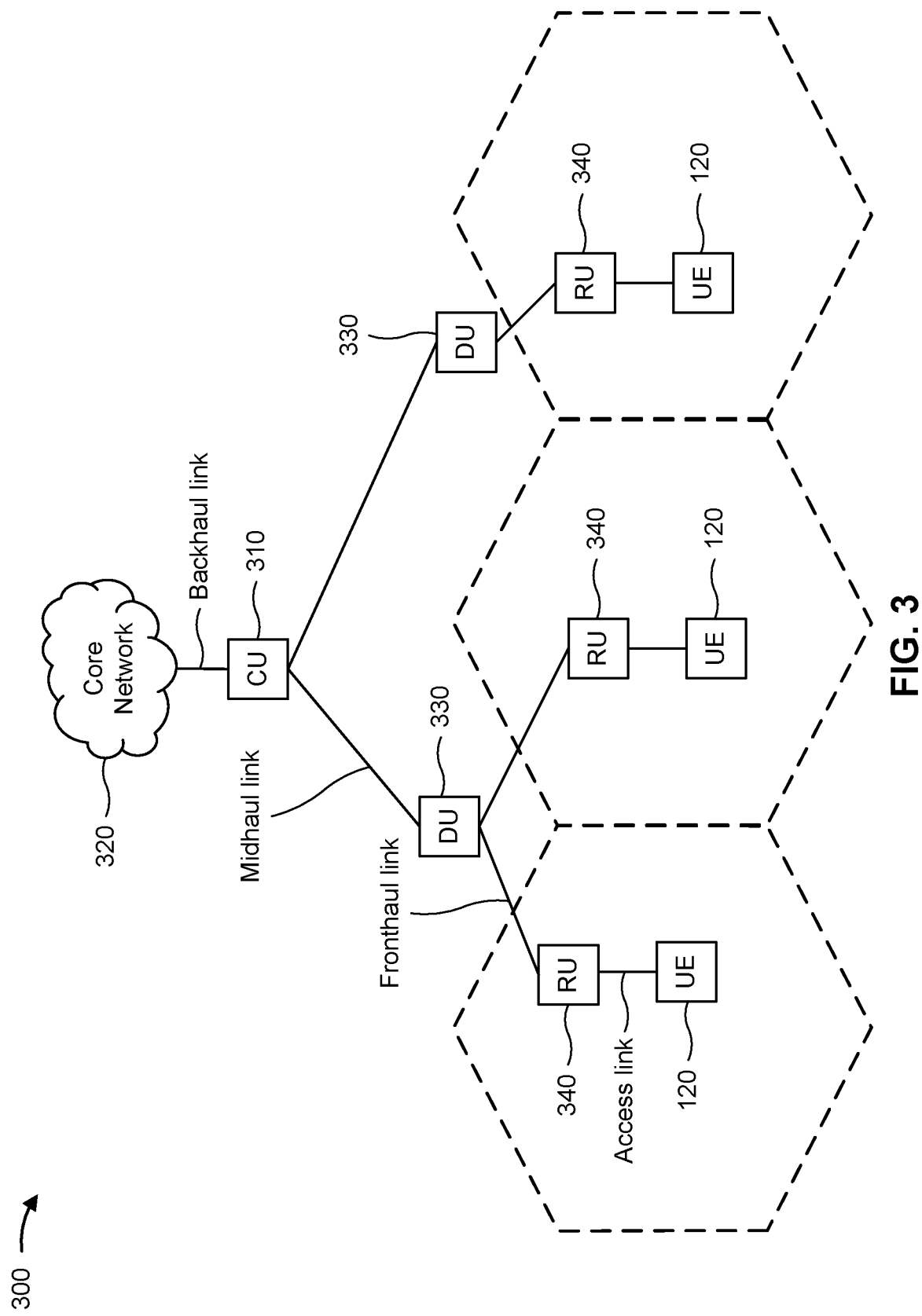
FIG. 3 is a diagram illustrating an example of an open radio access network architecture, in accordance with the present disclosure.

FIG. 3 is a diagram illustrating an example 300 of an O-RAN architecture, in accordance with the present disclosure. As shown in FIG. 3, the O-RAN architecture may include a CU 310 that communicates with a core network 320 via a backhaul link. Furthermore, the CU 310 may communicate with one or more DUs 330 via respective midhaul links. The DUs 330 may each communicate with one or more RUs 340 via respective fronthaul links, and the RUs 340 may each communicate with respective UEs 120 via radio frequency (RF) access links. The DUs 330 and the RUs 340 may also be referred to as O-RAN DUs (O-DUs) 330 and O-RAN RUs (O-RUs) 340, respectively.

In some aspects, the DUs 330 and the RUs 340 may be implemented according to a functional split architecture in which functionality of a base station 110 (e.g., an eNB or a gNB) is provided by a DU 330 and one or more RUs 340 that communicate over a fronthaul link. Accordingly, as described herein, a base station 110 may include a DU 330 and one or more RUs 340 that may be co-located or geographically distributed. In some aspects, the DU 330 and the associated RU(s) 340 may communicate via a fronthaul link to exchange real-time control plane information via a lower layer split (LLS) control plane (LLS-C) interface, to exchange non-real-time management information via an LLS management plane (LLS-M) interface, and/or to exchange user plane information via an LLS user plane (LLS-U) interface.

Accordingly, the DU 330 may correspond to a logical unit that includes one or more base station functions to control the operation of one or more RUs 340. For example, in some aspects, the DU 330 may host a radio link control (RLC) layer, a medium access control (MAC) layer, and one or more high physical (PHY) layers (e.g., forward error correction (FEC) encoding and decoding, scrambling, and/or modulation and demodulation) based at least in part on a lower layer functional split. Higher layer control functions, such as a packet data convergence protocol (PDCP), RRC, and/or service data adaptation protocol (SDAP), may be hosted by the CU 310. The RU(s) 340 controlled by a DU 330 may correspond to logical nodes that host RF processing functions and low-PHY layer functions (e.g., fast Fourier transform (FFT), inverse FFT (iFFT), digital beamforming, and/or physical random access channel (PRACH) extraction and filtering) based at least in part on the lower layer functional split. Accordingly, in an O-RAN architecture, the RU(s) 340 handle all over the air (OTA) communication with a UE 120, and real-time and non-real-time aspects of control and user plane communication with the RU(s) 340 are controlled by the corresponding DU 330, which enables the DU(s) 330 and the CU 310 to be implemented in a cloud-based RAN architecture.

As indicated above, FIG. 3 is provided as an example. Other examples may differ from what is described with regard to FIG. 3.

Figure 4:
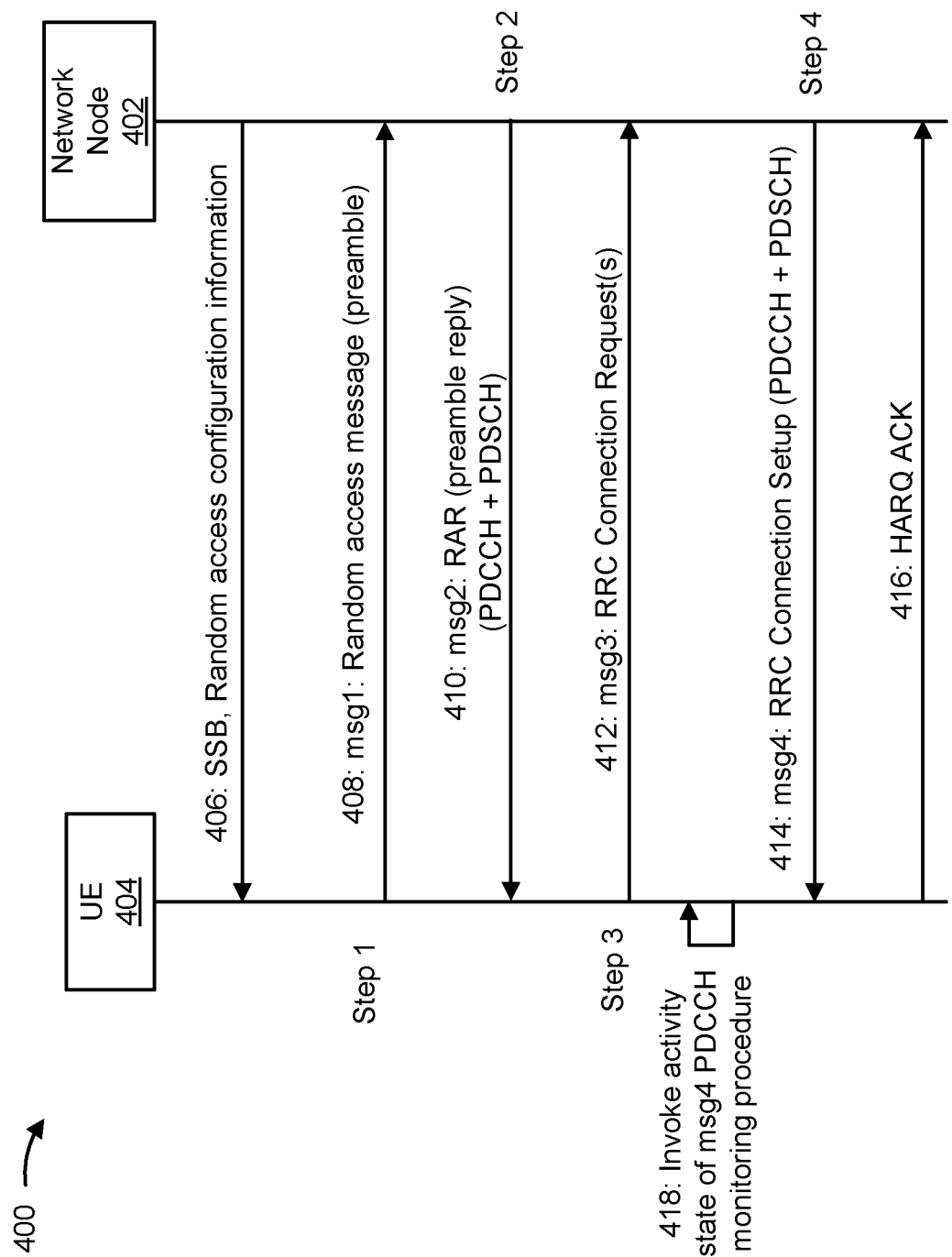
FIG. 4 is a diagram illustrating an example of a four-step random access channel (RACH) procedure, in accordance with the present disclosure.

FIG. 4 is a diagram illustrating an example 400 of a four-step RACH procedure, in accordance with the present disclosure. As shown in FIG. 4, a network node 402 and a UE 404 may communicate with one another to perform the four-step random access procedure.

As shown by reference number 406, the network node 402 may transmit, and the UE 404 may receive, one or more synchronization signal blocks (SSBs) and random access configuration information. In some aspects, the random access configuration information may be transmitted in and/or indicated by system information (e.g., in one or more system information blocks (SIBs) and/or the like) and/or an SSB, such as for contention-based random access. Additionally, or alternatively, the random access configuration information may be transmitted in an RRC message and/or a PDCCH order message that triggers a RACH procedure, such as for contention-free random access. The random access configuration information may include one or more parameters to be used in the random access procedure, such as one or more parameters for transmitting a random access message (RAM), one or more parameters for receiving a random access response (RAR), and/or the like.

As shown by reference number 408, the UE 404 may transmit a RAM with a RACH request via a PRACH. The RAM may include a preamble (sometimes referred to as a random access preamble, a PRACH preamble, a RAM preamble, and/or the like). The message that includes the preamble may be referred to as a message 1, msg1, MSG1, a first message, an initial message, and/or the like in a four-step random access procedure. The random access message may include a random access preamble identifier.

As shown by reference number 410, the network node 402 may transmit an RAR as a reply to the preamble. The message that includes the RAR may be referred to as message 2, msg2, MSG2, or a second message in a four-step random access procedure. In some aspects, the RAR may indicate the detected random access preamble identifier (e.g., received from the UE 120 in msg1). Additionally, or alternatively, the RAR may indicate a resource allocation to be used by the UE 404 to transmit message 3 (msg3) (see below).

In some aspects, as part of the second step of the four-step random access procedure, the network node 402 may transmit a PDCCH communication for the RAR. The PDCCH communication may schedule a physical downlink shared channel (PDSCH) communication that includes the RAR. For example, the PDCCH communication may indicate a resource allocation for the PDSCH communication. Also, as part of the second step of the four-step random access procedure, the network node 402 may transmit the PDSCH communication for the RAR, as scheduled by the PDCCH communication. The RAR may be included in a MAC protocol data unit (PDU) of the PDSCH communication.

As shown by reference number 412, the UE 404 may transmit an RRC connection request message. The RRC connection request message may be referred to as message 3, msg3, MSG3, a UE identification message, or a third message of a four-step random access procedure. In some aspects, the RRC connection request may include a UE identifier, uplink control information (UCI), a physical uplink shared channel (PUSCH) communication (e.g., an RRC connection request), and/or the like.

As shown by reference number 414, the network node 402 may transmit an RRC connection setup message. The RRC connection setup message may be referred to as message 4, msg4, MSG4, or a fourth message of a four-step random access procedure. In some aspects, the RRC connection setup message may include the detected UE identifier, a timing advance value, contention resolution information, and/or the like. As shown by reference number 416, if the UE 404 successfully receives the RRC connection setup message, the UE 404 may transmit a hybrid automatic repeat request (HARD) acknowledgement (ACK).

In some aspects, as part of the fourth step of the four-step random access procedure, the network node 402 may transmit a PDCCH communication for the RRC connection setup message. The PDCCH communication may schedule a PDSCH communication that includes the RRC connection setup message. For example, the PDCCH communication may indicate a resource allocation for the PDSCH communication. Also, as part of the fourth step of the four-step random access procedure, the network node 402 may transmit the PDSCH communication for the RRC connection setup message, as scheduled by the PDCCH communication. The RRC connection setup message may be included in a MAC control element (MAC CE) of the PDSCH communication.

Monitoring for the RRC connection setup message PDCCH begins with the start of a contention resolution timer (which may be indicated using a variable, ContentionResolutionTimer). In some cases, the contention resolution timer starts at the first symbol after the transmission of the RRC connection request message. In some cases involving RRC connection request message repetition, the contention resolution timer may start after all of the RRC connection request message repetitions. In other cases involving RRC connection request message repetition, the contention resolution timer may start after the first repetition of the RRC connection request message. The latter case may enable early termination of RRC connection request message repetition, which can facilitate UE power savings, as well as more efficient management of uplink resources for RRC connection request message transmission. However, early termination of monitoring for RRC connection setup message PDCCH can hurt the ability of the UE to maintain phase continuity, thereby reducing the effectiveness of joint channel estimation and, as a result, may have negative impact on network performance.

Aspects of techniques and apparatuses described herein may facilitate invocation of activity states for a RRC connection setup message PDCCH monitoring procedure. For example, as shown by reference number 418, some aspects may enable a UE to invoke an activity state of an RRC connection set up message PDCCH monitoring procedure. Thus, aspects may enable dynamic invocation of activity states associated with the RRC connection set up message PDCCH monitoring such as, for example, refraining from monitoring during RRC connection request message repetitions that are to be used for joint channel estimation. In this way, aspects increase the ability of the UE to maintain phase continuity and/or may increase the effectiveness of joint channel estimation, thereby positively impacting network performance.

As indicated above, FIG. 4 is provided as an example. Other examples may differ from what is described with regard to FIG. 4.

Figure 5:
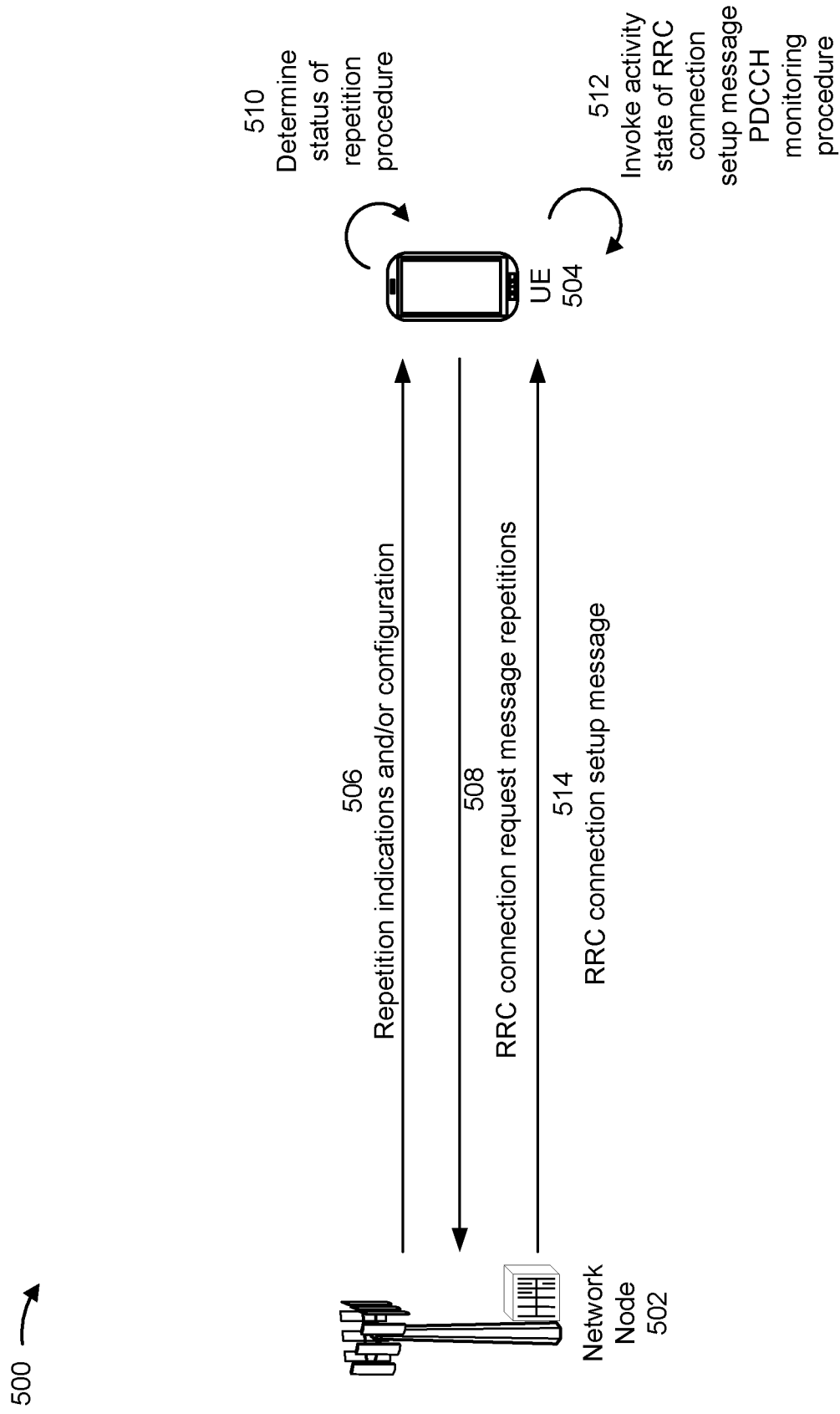
FIG. 5 is a diagram illustrating an example associated with invoking an activity state of a radio resource control (RRC) connection setup message physical downlink control channel (PDCCH) monitoring procedure, in accordance with the present disclosure.

FIG. 5 is a diagram illustrating an example 500 associated with invoking an activity state of an RRC connection setup message PDCCH monitoring procedure, in accordance with the present disclosure. As shown in FIG. 5, a network node 502 and a UE 504 may communicate with one another.

As shown by reference number 506, the network node 502 may transmit, and the UE 504 may receive, one or more repetition indications and/or configurations. The one or more repetition indications and/or configurations may be transmitted via system information (e.g., an SIB) and/or via an RAR, among other examples.

In some aspects, the one or more repetitions and/or configurations may include an indication that a subset of RRC connection request message repetitions are to be used for joint channel estimation. For example, the UE 504 may be expected to skip (or not start) monitoring of Msg4 PDCCH in the middle of a subset of Msg3 repetitions that are used (or expected to be used) for joint channel estimation. As used herein, the term "repetition" is used to refer to an initial communication and is also used to refer to a repeated transmission of the initial communication. For example, if the UE 120 is configured to transmit four repetitions, then the UE 504 may transmit an initial transmission and may transmit three repeated transmissions of that initial transmission. Thus, each transmission (regardless of whether the transmission is an initial transmission or a retransmission) is considered a repetition. A repetition may be transmitted in a transmission occasion, which is sometimes referred to as a transmission instance.

In some aspects, the one or more repetition indications and/or configurations may include an indication of at least one parameter. The at least one parameter may include an indication of frequency hopping or an indication of a frequency hopping parameter. For example, a frequency hopping parameter may indicate a number of RRC connection request message repetitions that are transmitted on a frequency resource.

In some aspects, a transmitter, such as the UE 504 or the network node 502, may transmit one or more DMRSs to a receiver such as another UE or BS. A DMRS may include a reference signal that is generated from a base sequence, such as a Zadoff-Chu sequence or a Gold sequence. A DMRS may carry information used to estimate a radio channel for demodulation of an associated physical channel (e.g., PDCCH, PDSCH, physical uplink control channel (PUCCH), or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. DMRSs are used for both downlink communications and uplink communications.

The receiver may perform one or more measurements of the DMRS to estimate a physical channel on which one or more communications are transmitted from the transmitter. In this way, for example, the UE may determine whether a channel quality of the physical channel satisfies one or more channel quality thresholds, and the UE may use the results from the one or more measurements to facilitate demodulation of the communications transmitted on the physical channel.

In some aspects, the UE 504 may associate or bundle a plurality of time-domain resources for purposes of joint channel estimation (which may be referred to as uplink DMRS bundling and/or DMRS bundling), in which case the network node may assume that the same precoder is used across the plurality of time-domain resources and that DMRS transmissions across the plurality of time-domain resources may be coherently filtered to increase the accuracy of the channel estimation.

In some cases, whether the UE 504 supports PUSCH DMRS bundling and/or PUCCH DMRS bundling can depend on one or more UE capabilities for phase continuity maintenance. In some cases, the ability of a UE to maintain phase continuity can depend on whether the PUSCH transmission (or PUCCH transmission) is contiguous, a length of a gap between transmissions, and/or a configuration of the gap between transmissions, among other examples. In some aspects, then, the at least one parameter may indicate a number of repetitions associated with a DMRS bundling operation and/or a length of a bundling time window associated with the DMRS bundling operation. Additionally, or alternatively, the UE 504 may transmit an indication of one or more UE capabilities (e.g., UE capabilities for phase continuity maintenance) to the network node 502. In this way, the network node may configure repetition indications, parameters, and/or indications to invoke activity states accordingly.

In some aspects, the one or more repetition indications and/or configurations may include a timer start indication that indicates a start time for a contention resolution timer. In some aspects, for example, the UE 504 may be configured to start the contention resolution timer based at least in part on the timer start indication. In some aspects, the one or more repetition indications and/or configurations may include an indication of a joint channel estimation procedure. In some aspects, the one or more repetition indications and/or configurations may include a monitoring window indication that indicates at least one monitoring window parameter. For example, the at least one monitoring window parameter may include a start time of a monitoring window for monitoring RRC connection setup message PDCCHs and/or a duration of the monitoring window, among other examples.

As shown by reference number 508, the UE 504 may transmit, and the network node 502 may receive, one or more RRC connection request message repetitions in accordance with a repetition procedure associated with an RRC connection request message of a four-step RACH procedure. As shown by reference number 510, the UE 504 may determine a status of a repetition procedure associated with an RRC connection request message. In some aspects, for example, the UE 504 may determine the status of the repetition procedure by determining that the repetition procedure has started.

As shown by reference number 512, the UE 504 may invoke an activity state of an RRC connection setup message PDCCH monitoring procedure based at least in part on the status of the repetition procedure. In some aspects, the UE 504 may invoke the activity state by refraining from monitoring (e.g., refraining from starting the RRC connection setup message PDCCH monitoring procedure or refraining from continuing an already started RRC connection setup message PDCCH monitoring procedure) of RRC connection setup message PDCCHs during a time period. In some aspects, the time period comprises a time period between transmission of a first RRC connection request message repetition and transmission of a second RRC connection request message repetition. In some aspects, the time period comprises at least a portion of a time period between transmission of a first RRC connection request message repetition associated with the repetition procedure and a transmission of a last RRC connection request message repetition associated with the repetition procedure.

In some aspects, the UE 504 may determine that a subset of RRC connection request message repetitions are to be used for joint channel estimation. For example, the UE 504 may determine a status of the repetition procedure by determining that the subset of RRC connection request message repetitions are to be used for joint channel estimation. The UE 504 may invoke the activity state based at least in part on determining that the subset of RRC connection request message repetitions are to be used for joint channel estimation.

In some aspects, the UE 504 may determine that the subset of RRC connection request message repetitions are to be used for joint channel estimation based at least in part on receiving an indication that the subset of RRC connection request message repetitions are to be used for joint channel estimation. In some aspects, the UE 504 may determine that the subset of RRC connection request message repetitions are to be used for joint channel estimation based at least in part on at least one parameter. For example, in some aspects, the UE 504 may determine that the subset of RRC connection request message repetitions are to be used for joint channel estimation based at least in part on an indication of frequency hopping or an indication of a frequency hopping parameter.

In some aspects, the UE 504 may start a contention resolution timer at an end of the subset of RRC connection request message repetitions. For example, the UE 504 may invoke an activity state of an RRC connection setup message PDCCH monitoring procedure by starting a contention resolution timer. In some aspects, for example, the UE 504 may determine that a subset of RRC connection request message repetitions comprises a first subset of a plurality of subsets of RRC connection request message repetitions that are to be used for joint channel estimation, and the UE 504 may start the contention resolution timer based at least in part on determining that the subset of the RRC connection request message repetitions comprises the first subset of the plurality of subsets. For example, the UE 504 may start the contention resolution timer at the end of the subset. In some aspects, the UE 504 may restart the contention resolution timer at an end of an additional subset of RRC connection request message repetitions that are to be used for joint channel estimation. In some aspects, the UE 504 may restart the contention resolution timer at an end of each of a plurality of subsets of RRC connection request message repetitions that are to be used for joint channel estimation.

In some aspects, the UE 504 may determine a start time for the contention resolution timer. For example, the UE 504 may determine the start time based at least in part on an indication of the start time. In some aspects, the UE 504 may determine the start time based at least in part on at least one parameter, an indication of a joint channel estimation procedure, an indication of a frequency hopping and/or an indication of a frequency hopping parameter, among other examples.

In some aspects, the UE 504 may determine a time interval corresponding to the repetition procedure and may start the contention resolution timer after a last RRC connection request message of the repetition procedure. In some aspects, the UE 504 may determine a monitoring window defined within a time interval corresponding to the repetition procedure. The UE 504 may start the contention resolution timer during the monitoring window. In some aspects, the UE 504 may determine the monitoring window by determining at least one monitoring window parameter. For example, the at least one monitoring window parameter may comprise a start time of the monitoring window and/or a duration of the monitoring window, among other examples. In some aspects, the UE 504 may determine the monitoring window based at least in part on at least one of an indication of frequency hopping or an indication of a frequency hopping parameter. In some aspects, the UE 504 may determine the monitoring window based at least in part on receiving a monitoring window indication that indicates at least one monitoring window parameter. The at least one parameter may indicate a number of repetitions associated with a DMRS bundling operation and/or a length of a bundling time window associated with the DMRS bundling operation, among other examples.

In some aspects, the UE 504 may refrain from receiving a PDCCH transmission that schedules an RRC connection setup message. The UE 504 may receive the RRC connection setup message after a last RRC connection request message repetition associated with the repetition procedure. In some aspects, the UE 504 may invoke the activity state based at least in part on at least one UE capability associated with joint channel estimation. For example, the at least one UE capability associated with joint channel estimation may comprise at least one UE capability for phase continuity.

As shown by reference number 514, the network node 502 may transmit, and the UE 504 may receive, an RRC connection setup message in accordance with the activity state of the RRC connection setup message PDCCH monitoring procedure.

As indicated above, FIG. 5 is provided as an example. Other examples may differ from what is described with respect to FIG. 5.

Figure 6:
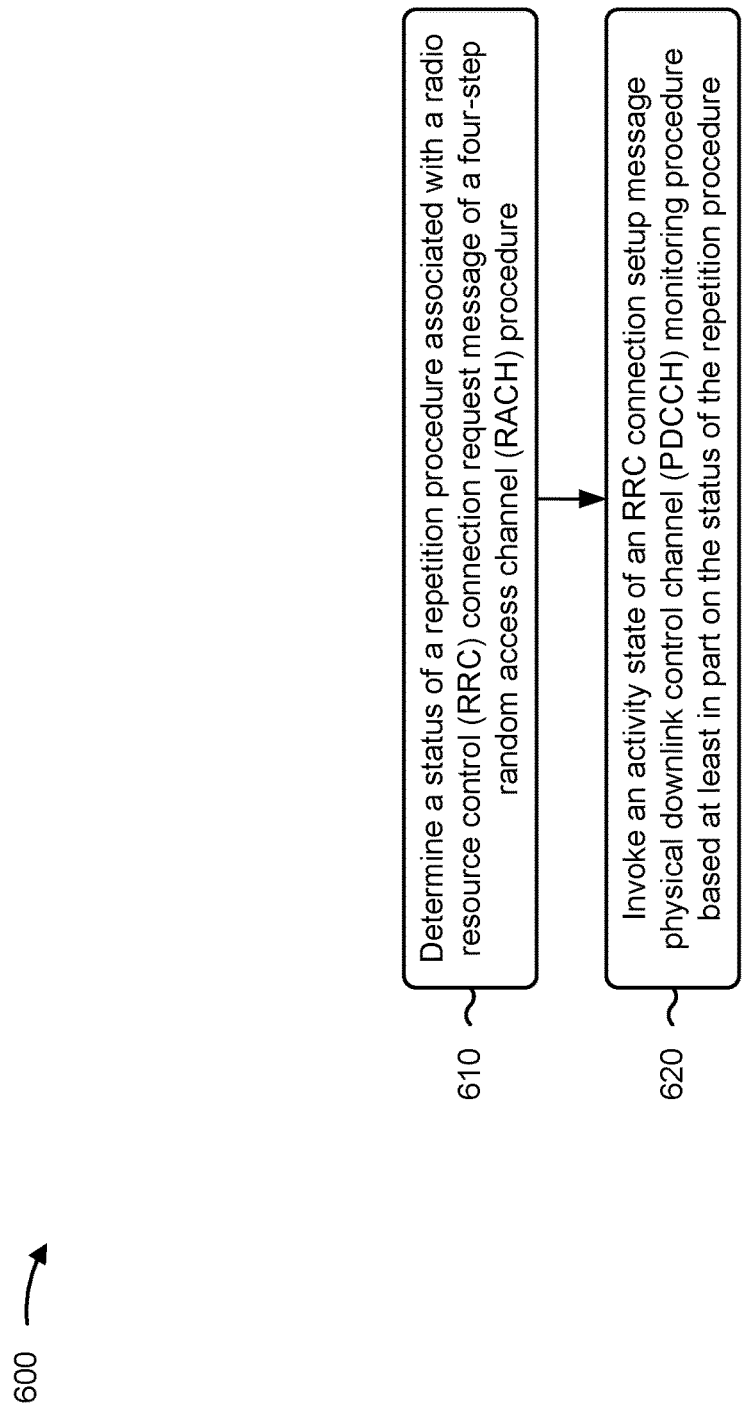
FIGS. 6 and 7 are diagrams illustrating example processes associated with invoking an activity state of an RRC connection setup message PDCCH monitoring procedure, in accordance with the present disclosure.

FIG. 6 is a diagram illustrating an example process 600 performed, for example, by a UE, in accordance with the present disclosure. Example process 600 is an example where the UE (e.g., UE 504) performs operations associated with invoking an activity state of an RRC connection setup message PDCCH monitoring procedure.

As shown in FIG. 6, in some aspects, process 600 may include determining a status of a repetition procedure associated with an RRC connection request message of a four-step RACH procedure (block 610). For example, the UE (e.g., using communication manager 140 and/or determination component 808, depicted in FIG. 8) may determine a status of a repetition procedure associated with an RRC connection request message of a four-step RACH procedure, as described above.

As further shown in FIG. 6, in some aspects, process 600 may include invoking an activity state of an RRC connection setup message PDCCH monitoring procedure based at least in part on the status of the repetition procedure (block 620). For example, the UE (e.g., using communication manager 140 and/or reception component 802, depicted in FIG. 8) may invoke an activity state of an RRC connection setup message PDCCH monitoring procedure based at least in part on the status of the repetition procedure, as described above.

Process 600 may include additional aspects, such as any single aspect or any combination of aspects described below and/or in connection with one or more other processes described elsewhere herein.

In a first aspect, determining the status of the repetition procedure comprises determining that the repetition procedure has started.

In a second aspect, alone or in combination with the first aspect, invoking the activity state comprises refraining from monitoring of RRC connection setup message PDCCH during a time period.

In a third aspect, alone or in combination with the second aspect, the time period comprises a time period between transmission of a first RRC connection request message repetition and transmission of a second RRC connection request message repetition.

In a fourth aspect, alone or in combination with one or more of the second through third aspects, the time period comprises at least a portion of a time period between transmission of a first RRC connection request message repetition associated with the repetition procedure and a transmission of a last RRC connection request message repetition associated with the repetition procedure.

In a fifth aspect, alone or in combination with one or more of the second through fourth aspects, refraining from monitoring of the RRC connection setup message PDCCH during the time period comprises refraining from starting the RRC connection setup message PDCCH monitoring procedure.

In a sixth aspect, alone or in combination with one or more of the first through fifth aspects, process 600 includes determining that a subset of RRC connection request message repetitions are to be used for joint channel estimation.

In a seventh aspect, alone or in combination with the sixth aspect, invoking the activity state comprises invoking the activity state based at least in part on determining that the subset of RRC connection request message repetitions are to be used for joint channel estimation.

In an eighth aspect, alone or in combination with one or more of the sixth through seventh aspects, determining that the subset of RRC connection request message repetitions are to be used for joint channel estimation comprises receiving an indication that the subset of RRC connection request message repetitions are to be used for joint channel estimation.

In a ninth aspect, alone or in combination with the eighth aspect, receiving the indication comprises receiving a system information block that includes the indication.

In a tenth aspect, alone or in combination with one or more of the eighth through ninth aspects, receiving the indication comprises receiving a random access response that includes the indication.

In an eleventh aspect, alone or in combination with one or more of the sixth through tenth aspects, determining that the subset of RRC connection request message repetitions are to be used for joint channel estimation comprises determining that the subset of RRC connection request message repetitions are to be used for joint channel estimation based at least in part on at least one parameter.

In a twelfth aspect, alone or in combination with the eleventh aspect, process 600 includes receiving an indication of the at least one parameter.

In a thirteenth aspect, alone or in combination with one or more of the eleventh through twelfth aspects, the at least one parameter indicates at least one of a number of repetitions associated with a DMRS bundling operation, or a length of a bundling time window associated with the DMRS bundling operation.

In a fourteenth aspect, alone or in combination with one or more of the sixth through thirteenth aspects, determining that the subset of RRC connection request message repetitions are to be used for joint channel estimation comprises determining that the subset of RRC connection request message repetitions are to be used for joint channel estimation based at least in part on at least one of an indication of frequency hopping or an indication of a frequency hopping parameter.

In a fifteenth aspect, alone or in combination with one or more of the sixth through fourteenth aspects, process 600 includes starting a contention resolution timer at an end of the subset of RRC connection request message repetitions.

In a sixteenth aspect, alone or in combination with the fifteenth aspect, process 600 includes determining that the subset of the RRC connection request message repetitions comprises a first subset of a plurality of subsets of RRC connection request message repetitions that are to be used for joint channel estimation, wherein starting the contention resolution timer comprises starting the contention resolution timer based at least in part on determining that the subset of the RRC connection request message repetitions comprises the first subset of the plurality of subsets.

In a seventeenth aspect, alone or in combination with one or more of the fifteenth through sixteenth aspects, process 600 includes restarting the contention resolution timer at an end of an additional subset of RRC connection request message repetitions that are to be used for joint channel estimation.

In an eighteenth aspect, alone or in combination with one or more of the fifteenth through seventeenth aspects, process 600 includes restarting the contention resolution timer at an end of each of a plurality of subsets of RRC connection request message repetitions that are to be used for joint channel estimation.

In a nineteenth aspect, alone or in combination with one or more of the fifteenth through eighteenth aspects, process 600 includes receiving a timer start indication that indicates a start time for the contention resolution timer, wherein starting the contention resolution timer comprises starting the contention resolution timer based at least in part on the timer start indication.

In a twentieth aspect, alone or in combination with the nineteenth aspect, receiving the timer start indication comprises receiving a system information block that includes the timer start indication.

In a twenty-first aspect, alone or in combination with one or more of the nineteenth through twentieth aspects, receiving the timer start indication comprises receiving a random access response that includes the timer start indication.

In a twenty-second aspect, alone or in combination with one or more of the fifteenth through twenty-first aspects, process 600 includes determining a start time for the contention resolution timer, wherein starting the contention resolution timer comprises starting the contention resolution timer based at least in part on the start time.

In a twenty-third aspect, alone or in combination with the twenty-second aspect, determining the start time comprises determining the start time based at least in part on at least one parameter.

In a twenty-fourth aspect, alone or in combination with one or more of the twenty-second through twenty-third aspects, process 600 includes receiving an indication of a joint channel estimation procedure, wherein determining the start time comprises determining the start time based at least in part on the indication of the joint channel estimation procedure.

In a twenty-fifth aspect, alone or in combination with one or more of the twenty-second through twenty-fourth aspects, determining the start time comprises determining the start time based at least in part on at least one of an indication of frequency hopping or an indication of a frequency hopping parameter.

In a twenty-sixth aspect, alone or in combination with the twenty-fifth aspect, the frequency hopping parameter indicates a number of RRC connection request message repetitions that are transmitted on a frequency resource.

In a twenty-seventh aspect, alone or in combination with one or more of the first through twenty-sixth aspects, process 600 includes determining a time interval corresponding to the repetition procedure, and starting a contention resolution timer after a last RRC connection request message of the repetition procedure.

In a twenty-eighth aspect, alone or in combination with the twenty-seventh aspect, process 600 includes determining a monitoring window defined within the time interval corresponding to the repetition procedure, wherein starting the contention resolution timer comprises starting the contention resolution timer during the monitoring window.

In a twenty-ninth aspect, alone or in combination with the twenty-eighth aspect, determining the monitoring window comprises determining at least one monitoring window parameter.

In a thirtieth aspect, alone or in combination with the twenty-ninth aspect, the at least one monitoring window parameter comprises at least one of a start time of the monitoring window, or a duration of the monitoring window.

In a thirty-first aspect, alone or in combination with one or more of the twenty-eighth through thirtieth aspects, determining the monitoring window comprises receiving a monitoring window indication that indicates at least one monitoring window parameter.

In a thirty-second aspect, alone or in combination with the thirty-first aspect, receiving the monitoring window indication comprises receiving a system information block that includes the monitoring window indication.

In a thirty-third aspect, alone or in combination with one or more of the twenty-eighth through thirty-second aspects, determining the monitoring window comprises determining the monitoring window based at least in part on at least one parameter.

In a thirty-fourth aspect, alone or in combination with the thirty-third aspect, process 600 includes receiving an indication of the at least one parameter.

In a thirty-fifth aspect, alone or in combination with one or more of the thirty-third through thirty-fourth aspects, the at least one parameter indicates at least one of a number of repetitions associated with a DMRS bundling operation, or a length of a bundling time window associated with the DMRS bundling operation.

In a thirty-sixth aspect, alone or in combination with one or more of the twenty-eighth through thirty-fifth aspects, determining the monitoring window comprises determining the monitoring window based at least in part on at least one of an indication of frequency hopping or an indication of a frequency hopping parameter.

In a thirty-seventh aspect, alone or in combination with one or more of the first through thirty-sixth aspects, process 600 includes refraining from receiving a PDCCH transmission that schedules an RRC connection setup message.

In a thirty-eighth aspect, alone or in combination with the thirty-seventh aspect, process 600 includes receiving the RRC connection setup message after a last RRC connection request message repetition associated with the repetition procedure.

In a thirty-ninth aspect, alone or in combination with one or more of the first through thirty-eighth aspects, invoking the activity state comprises invoking the activity state comprises invoking the activity state based at least in part on at least one UE capability associated with joint channel estimation.

In a fortieth aspect, alone or in combination with the thirty-ninth aspect, the at least one UE capability associated with joint channel estimation comprises at least one UE capability for phase continuity.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
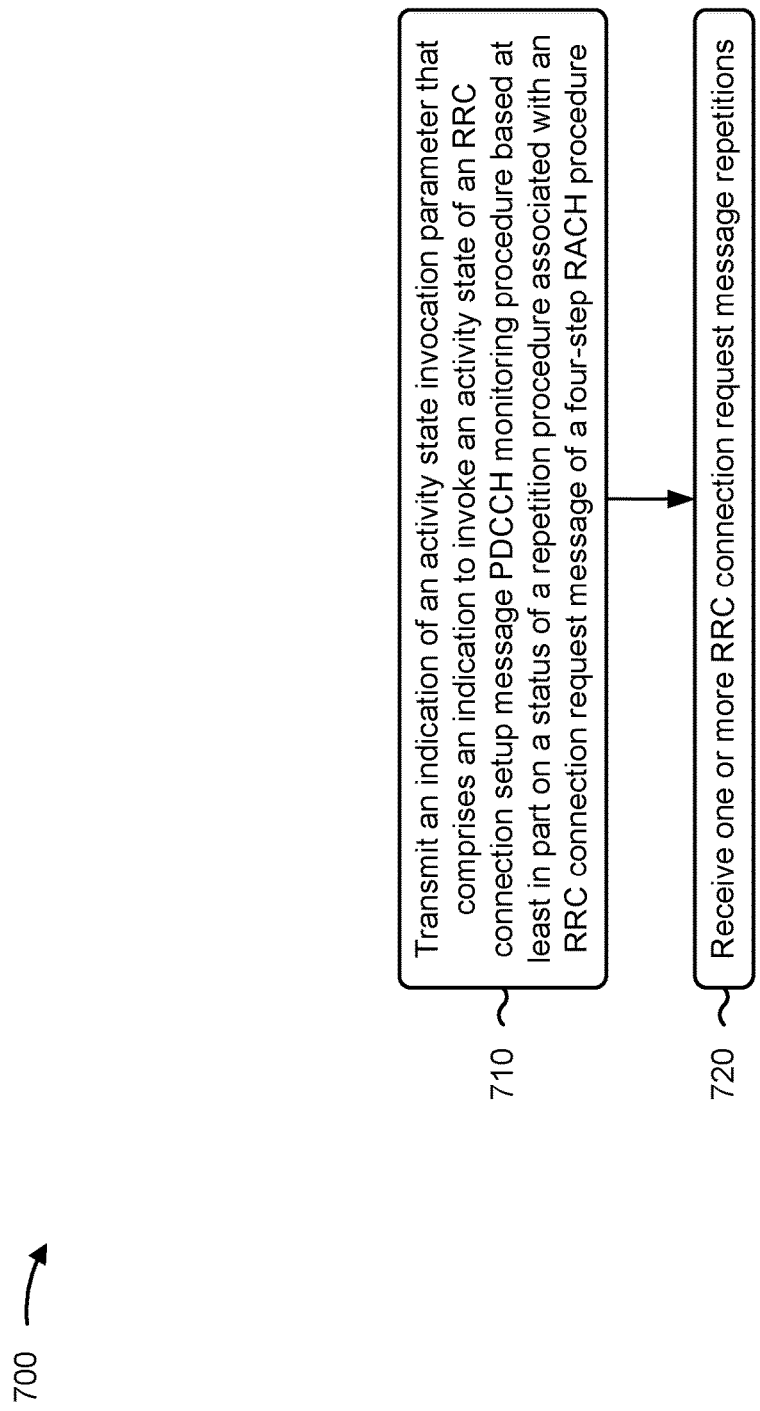

FIG. 7 is a diagram illustrating an example process 700 performed, for example, by a network node, in accordance with the present disclosure. Example process 700 is an example where the network node (e.g., network node 502) performs operations associated with invoking an activity state of an RRC connection setup message PDCCH monitoring procedure.

As shown in FIG. 7, in some aspects, process 700 may include transmitting an indication of an activity state invocation parameter that comprises an indication to invoke an activity state of an RRC connection setup message PDCCH monitoring procedure based at least in part on a status of a repetition procedure associated with an RRC connection request message of a four-step RACH procedure (block 710). For example, the network node (e.g., using communication manager 150 and/or transmission component 904, depicted in FIG. 9) may transmit an indication of an activity state invocation parameter that comprises an indication to invoke an activity state of an RRC connection setup message PDCCH monitoring procedure based at least in part on a status of a repetition procedure associated with an RRC connection request message of a four-step RACH procedure, as described above.

As further shown in FIG. 7, in some aspects, process 700 may include receiving one or more RRC connection request message repetitions (block 720). For example, the network node (e.g., using communication manager 150 and/or reception component 902, depicted in FIG. 9) may receive one or more RRC connection request message repetitions, as described above.

Process 700 may include additional aspects, such as any single aspect or any combination of aspects described below and/or in connection with one or more other processes described elsewhere herein.

In a first aspect, the indication to invoke the activity state comprises an indication to invoke the activity state based at least in part on a determination that the repetition procedure has started.

In a second aspect, alone or in combination with the first aspect, the indication to invoke the activity state comprises an indication to refrain from monitoring of RRC connection setup message PDCCH during a time period.

In a third aspect, alone or in combination with the second aspect, the time period comprises a time period between transmission of a first RRC connection request message repetition and transmission of a second RRC connection request message repetition.

In a fourth aspect, alone or in combination with one or more of the second through third aspects, the time period comprises at least a portion of a time period between transmission of a first RRC connection request message repetition associated with the repetition procedure and a transmission of a last RRC connection request message repetition associated with the repetition procedure.

In a fifth aspect, alone or in combination with one or more of the second through fourth aspects, the indication to refrain from monitoring of the RRC connection setup message PDCCH during the time period comprises an indication to refrain from starting the RRC connection setup message PDCCH monitoring procedure.

In a sixth aspect, alone or in combination with one or more of the first through fifth aspects, the indication to invoke the activity state comprises an indication to invoke the activity state based at least in part on a determination that a subset of RRC connection request message repetitions are to be used for joint channel estimation.

In a seventh aspect, alone or in combination with the sixth aspect, process 700 includes transmitting an indication that the subset of RRC connection request message repetitions are to be used for joint channel estimation, wherein the determination that the subset of RRC connection request message repetitions are to be used for joint channel estimation is based at least in part on the indication that the subset of RRC connection request message repetitions are to be used for joint channel estimation.

In an eighth aspect, alone or in combination with the seventh aspect, transmitting the indication comprises transmitting a system information block that includes the indication.

In a ninth aspect, alone or in combination with one or more of the seventh through eighth aspects, transmitting the indication comprises transmitting a random access response that includes the indication.

In a tenth aspect, alone or in combination with one or more of the sixth through ninth aspects, process 700 includes transmitting an indication of at least one parameter, wherein the determination that the subset of RRC connection request message repetitions are to be used for joint channel estimation is based at least in part on the at least one parameter.

In an eleventh aspect, alone or in combination with the tenth aspect, the at least one parameter indicates at least one of a number of repetitions associated with a DMRS bundling operation, or a length of a bundling time window associated with the DMRS bundling operation.

In a twelfth aspect, alone or in combination with one or more of the sixth through eleventh aspects, process 700 includes transmitting at least one of an indication of frequency hopping or an indication of a frequency hopping parameter, wherein the determination that the subset of RRC connection request message repetitions are to be used for joint channel estimation is based at least in part on the at least one of the indication of frequency hopping or the indication of the frequency hopping parameter.

In a thirteenth aspect, alone or in combination with one or more of the first through twelfth aspects, process 700 includes transmitting a timer start indication that indicates a start time for a contention resolution timer.

In a fourteenth aspect, alone or in combination the thirteenth aspect, the timer start indication comprises an indication to start the contention resolution timer based at least in part on a determination that the subset of the RRC connection request message repetitions comprises a first subset of a plurality of subsets.

In a fifteenth aspect, alone or in combination with one or more of the thirteenth through fourteenth aspects, the timer start indication comprises an indication to restart the contention resolution timer at an end of an additional subset of RRC connection request message repetitions that are to be used for joint channel estimation.

In a sixteenth aspect, alone or in combination with one or more of the thirteenth through fifteenth aspects, the timer start indication comprises an indication to restart the contention resolution timer at an end of each of a plurality of subsets of RRC connection request message repetitions that are to be used for joint channel estimation.

In a seventeenth aspect, alone or in combination with one or more of the thirteenth through sixteenth aspects, transmitting the timer start indication comprises transmitting a system information block that includes the timer start indication.

In an eighteenth aspect, alone or in combination with one or more of the thirteenth through seventeenth aspects, transmitting the timer start indication comprises transmitting a random access response that includes the timer start indication.

In a nineteenth aspect, alone or in combination with one or more of the thirteenth through eighteenth aspects, process 700 includes transmitting an indication of at least one parameter, and the timer start indication comprises an indication to start the contention resolution timer based at least in part on the at least one parameter.

In a twentieth aspect, alone or in combination with one or more of the thirteenth through nineteenth aspects, process 700 includes transmitting an indication of a joint channel estimation procedure, wherein the timer start indication comprises an indication to start the contention resolution timer based at least in part on the joint channel estimation procedure.

In a twenty-first aspect, alone or in combination with one or more of the thirteenth through twentieth aspects, process 700 includes transmitting at least one of an indication of frequency hopping or an indication of a frequency hopping parameter, wherein the timer start indication comprises an indication to start the contention resolution timer based at least in part on the at least one of an indication of frequency hopping or an indication of a frequency hopping parameter.

In a twenty-second aspect, alone or in combination with the twenty-first aspect, the frequency hopping parameter indicates a number of RRC connection request message repetitions that are transmitted on a frequency resource.

In a twenty-third aspect, alone or in combination with one or more of the thirteenth through twenty-second aspects, the timer start indication comprises an indication to start a contention resolution timer after a last RRC connection request message of the repetition procedure.

In a twenty-fourth aspect, alone or in combination with one or more of the thirteenth through twenty-third aspects, the timer start indication comprises an indication to start the contention resolution timer during a monitoring window defined within a time interval corresponding to the repetition procedure.

In a twenty-fifth aspect, alone or in combination with the twenty-fourth aspect, process 700 includes transmitting an indication of at least one monitoring window parameter.

In a twenty-sixth aspect, alone or in combination with the twenty-fifth aspect, the at least one monitoring window parameter comprises at least one of a start time of the monitoring window, or a duration of the monitoring window.

In a twenty-seventh aspect, alone or in combination with one or more of the twenty-fifth through twenty-sixth aspects, transmitting the monitoring window indication comprises transmitting a system information block that includes the monitoring window indication.

In a twenty-eighth aspect, alone or in combination with one or more of the twenty-fourth through twenty-seventh aspects, process 700 includes transmitting an indication of at least one parameter, wherein the timer start indication comprises an indication to determine the monitoring window based at least in part on the at least one parameter.

In a twenty-ninth aspect, alone or in combination with the twenty-eighth aspect, the at least one parameter indicates at least one of a number of repetitions associated with a DMRS bundling operation, or a length of a bundling time window associated with the DMRS bundling operation.

In a thirtieth aspect, alone or in combination with one or more of the first through twenty-ninth aspects, process 700 includes transmitting a PDCCH transmission that schedules an RRC connection setup message.

In a thirty-first aspect, alone or in combination with the thirtieth aspect, process 700 includes transmitting the RRC connection setup message after a last RRC connection request message repetition associated with the repetition procedure.

In a thirty-second aspect, alone or in combination with one or more of the first through thirty-first aspects, the indication to invoke the activity state comprises an indication to invoke the activity state based at least in part on at least one UE capability associated with joint channel estimation.

In a thirty-third aspect, alone or in combination with the thirty-second aspect, the at least one UE capability associated with joint channel estimation comprises at least one UE capability for phase continuity.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
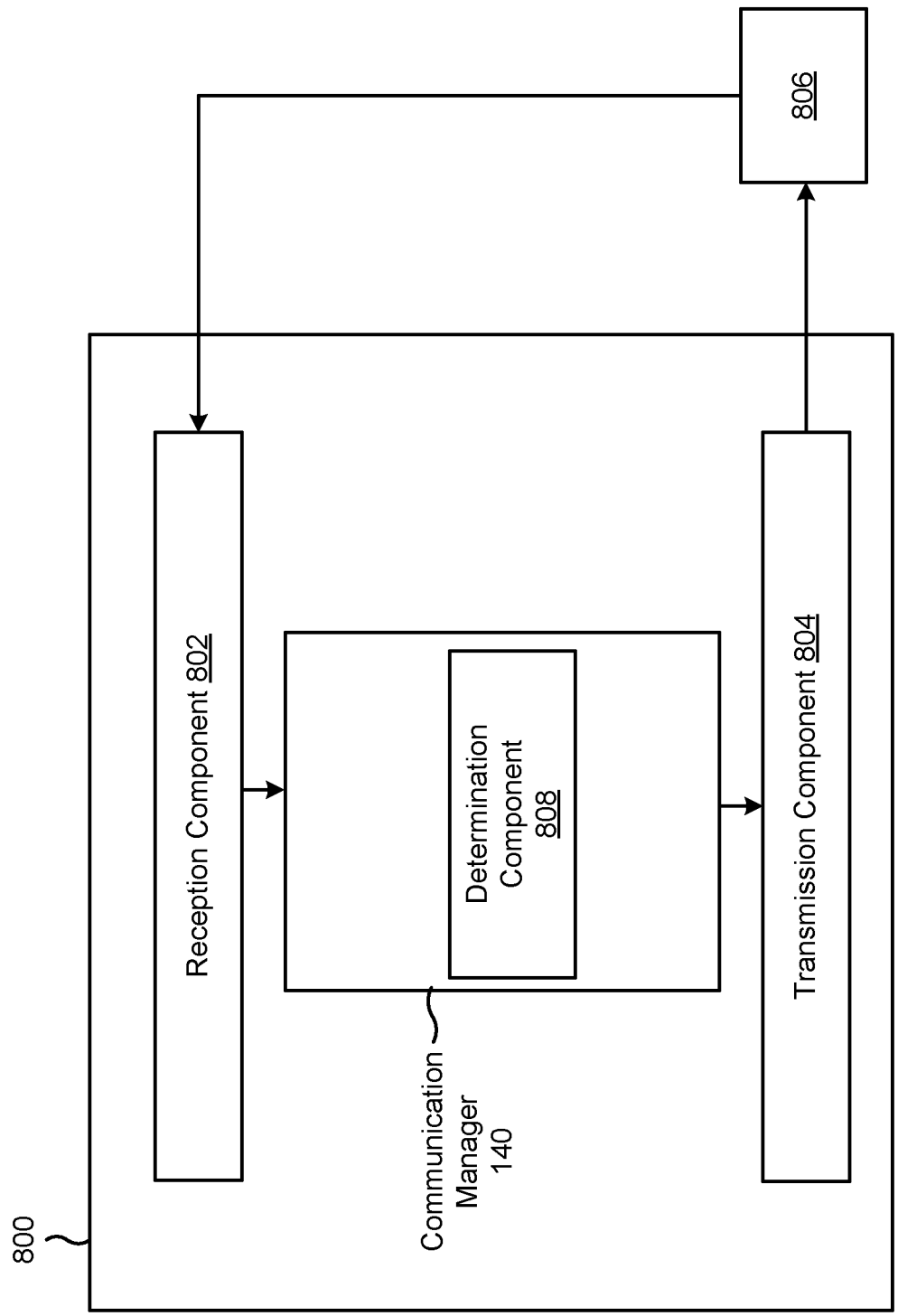

FIG. 8 is a block diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a network node, or another wireless communication device) using the reception component 802 and the transmission component 804. As further shown, the apparatus 800 may include the communication manager 140. The communication manager 140 may include a determination component 808.

In some aspects, the apparatus 800 may be configured to perform one or more operations described herein in connection with FIG. 5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The determination component 808 may determine a status of a repetition procedure associated with an RRC connection request message of a four-step RACH procedure. In some aspects, the determination component 808 may include one or more antennas, a modulator, a transmit MIMO processor, a transmit processor, a controller/processor, a memory, or a combination thereof, of the UE described in connection with FIG. 2. In some aspects, the determination component 808 may include the reception component 802 and/or the transmission component 804.

The communication manager 140 and/or reception component 802 may invoke an activity state of an RRC connection setup message PDCCH monitoring procedure based at least in part on the status of the repetition procedure. In some aspects, the communication manager 140 may include one or more antennas, a modulator, a transmit MIMO processor, a transmit processor, a controller/processor, a memory, or a combination thereof, of the UE described in connection with FIG. 2. In some aspects, the communication manager 140 may include the reception component 802, the transmission component 804, and/or the determination component 808.

The determination component 808 may determine that a subset of RRC connection request message repetitions are to be used for joint channel estimation.

The reception component 802 may receive an indication of the at least one parameter.

The communication manager 140 and/or the reception component 802 may start a contention resolution timer at an end of the subset of RRC connection request message repetitions.

The determination component 808 may determine that the subset of the RRC connection request message repetitions comprises a first subset of a plurality of subsets of RRC connection request message repetitions that are to be used for joint channel estimation, wherein starting the contention resolution timer comprises starting the contention resolution timer based at least in part on determining that the subset of the RRC connection request message repetitions comprises the first subset of the plurality of subsets.

The communication manager 140 and/or the reception component 802 may restart the contention resolution timer at an end of an additional subset of RRC connection request message repetitions that are to be used for joint channel estimation.

The communication manager 140 and/or the reception component 802 may restart the contention resolution timer at an end of each of a plurality of subsets of RRC connection request message repetitions that are to be used for joint channel estimation.

The reception component 802 may receive a timer start indication that indicates a start time for the contention resolution timer, wherein starting the contention resolution timer comprises starting the contention resolution timer based at least in part on the timer start indication.

The determination component 808 may determine a start time for the contention resolution timer, wherein starting the contention resolution timer comprises starting the contention resolution timer based at least in part on the start time.

The reception component 802 may receive an indication of a joint channel estimation procedure, wherein determining the start time comprises determining the start time based at least in part on the indication of the joint channel estimation procedure.

The determination component 808 may determine a time interval corresponding to the repetition procedure.

The communication manager 140 and/or the reception component 802 may start a contention resolution timer after a last RRC connection request message of the repetition procedure.

The determination component 808 may determine a monitoring window defined within the time interval corresponding to the repetition procedure, wherein starting the contention resolution timer comprises starting the contention resolution timer during the monitoring window.

The reception component 802 may receive an indication of the at least one parameter.

The communication manager 140 and/or the reception component 802 may refrain from receiving a PDCCH transmission that schedules an RRC connection setup message.

The reception component 802 may receive the RRC connection setup message after a last RRC connection request message repetition associated with the repetition procedure.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

FIG. 9 is a block diagram of an example apparatus 900 for wireless communication. The apparatus 900 may be a network node, or a network node may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a network node, or another wireless communication device) using the reception component 902 and the transmission component 904. As further shown, the apparatus 900 may include the communication manager 150.

In some aspects, the apparatus 900 may be configured to perform one or more operations described herein in connection with FIG. 5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the base station described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the base station described in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the base station described in connection with FIG. 2. In some aspects, the transmission component 904 may be co-located with the reception component 902 in a transceiver.

The transmission component 904 may transmit an indication of an activity state invocation parameter that comprises an indication to invoke an activity state of an RRC connection setup message PDCCH monitoring procedure based at least in part on a status of a repetition procedure associated with an RRC connection request message of a four-step RACH procedure. The reception component 902 may receive one or more RRC connection request message repetitions.

The transmission component 904 may transmit an indication that the subset of RRC connection request message repetitions are to be used for joint channel estimation, wherein the determination that the subset of RRC connection request message repetitions are to be used for joint channel estimation is based at least in part on the indication that the subset of RRC connection request message repetitions are to be used for joint channel estimation.

The transmission component 904 may transmit an indication of at least one parameter, wherein the determination that the subset of RRC connection request message repetitions are to be used for joint channel estimation is based at least in part on the at least one parameter.

The transmission component 904 may transmit at least one of an indication of frequency hopping or an indication of a frequency hopping parameter, wherein the determination that the subset of RRC connection request message repetitions are to be used for joint channel estimation is based at least in part on the at least one of the indication of frequency hopping or the indication of the frequency hopping parameter.

The transmission component 904 may transmit a timer start indication that indicates a start time for a contention resolution timer.

The transmission component 904 may transmit an indication of at least one parameter, and the timer start indication comprises an indication to start the contention resolution timer based at least in part on the at least one parameter.

The transmission component 904 may transmit an indication of a joint channel estimation procedure, wherein the timer start indication comprises an indication to start the contention resolution timer based at least in part on the joint channel estimation procedure.

The transmission component 904 may transmit at least one of an indication of frequency hopping or an indication of a frequency hopping parameter, wherein the timer start indication comprises an indication to start the contention resolution timer based at least in part on the at least one of an indication of frequency hopping or an indication of a frequency hopping parameter.

The transmission component 904 may transmit an indication of at least one monitoring window parameter.

The transmission component 904 may transmit an indication of at least one parameter, wherein the timer start indication comprises an indication to determine the monitoring window based at least in part on the at least one parameter.

The transmission component 904 may transmit a PDCCH transmission that schedules an RRC connection setup message.

The transmission component 904 may transmit the RRC connection setup message after a last RRC connection request message repetition associated with the repetition procedure.

The communication manager 150 may be configured to determine resource allocations, parameters, and/or otherwise manage the operations of the reception component 902 and/or the transmission component 904. In some aspects, the communication manager 150 may include one or more antennas, a modulator, a transmit MIMO processor, a transmit processor, a controller/processor, a memory, or a combination thereof, of the base station described in connection with FIG. 2. In some aspects, the communication manager 150 may include the reception component 902 and/or the transmission component 904.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: determining a status of a repetition procedure associated with a radio resource control (RRC) connection request message of a four-step random access channel (RACH) procedure; and invoking an activity state of an RRC connection setup message PDCCH monitoring procedure based at least in part on the status of the repetition procedure.

Aspect 2: The method of Aspect 1, wherein determining the status of the repetition procedure comprises determining that the repetition procedure has started.

Aspect 3: The method of either of Aspects 1 or 2, wherein invoking the activity state comprises refraining from monitoring of RRC connection setup message physical downlink control channel (PDCCH) during a time period.

Aspect 4: The method of Aspect 3, wherein the time period comprises a time period between transmission of a first RRC connection request message repetition and transmission of a second RRC connection request message repetition.

Aspect 5: The method of either of Aspects 3 or 4, wherein the time period comprises at least a portion of a time period between transmission of a first RRC connection request message repetition associated with the repetition procedure and a transmission of a last RRC connection request message repetition associated with the repetition procedure.

Aspect 6: The method of any of Aspects 3-5, wherein refraining from monitoring of the RRC connection setup message PDCCH during the time period comprises refraining from starting the RRC connection setup message PDCCH monitoring procedure.

Aspect 7: The method of any of Aspects 1-6, further comprising determining that a subset of RRC connection request message repetitions are to be used for joint channel estimation.

Aspect 8: The method of Aspect 7, wherein invoking the activity state comprises invoking the activity state based at least in part on determining that the subset of RRC connection request message repetitions are to be used for joint channel estimation.

Aspect 9: The method of either of Aspects 7 or 8, wherein determining that the subset of RRC connection request message repetitions are to be used for joint channel estimation comprises receiving an indication that the subset of RRC connection request message repetitions are to be used for joint channel estimation.

Aspect 10: The method of Aspect 9, wherein receiving the indication comprises receiving a system information block that includes the indication.

Aspect 11: The method of either of Aspects 9 or 10, wherein receiving the indication comprises receiving a random access response that includes the indication.

Aspect 12: The method of any of Aspects 7-11, wherein determining that the subset of RRC connection request message repetitions are to be used for joint channel estimation comprises determining that the subset of RRC connection request message repetitions are to be used for joint channel estimation based at least in part on at least one parameter.

Aspect 13: The method of Aspect 12, further comprising receiving an indication of the at least one parameter.

Aspect 14: The method of either of Aspects 12 or 13, wherein the at least one parameter indicates at least one of: a number of repetitions associated with a demodulation reference signal (DMRS) bundling operation, or a length of a bundling time window associated with the DMRS bundling operation.

Aspect 15: The method of any of Aspects 7-14, wherein determining that the subset of RRC connection request message repetitions are to be used for joint channel estimation comprises determining that the subset of RRC connection request message repetitions are to be used for joint channel estimation based at least in part on at least one of an indication of frequency hopping or an indication of a frequency hopping parameter.

Aspect 16: The method of any of Aspects 7-15, further comprising starting a contention resolution timer at an end of the subset of RRC connection request message repetitions.

Aspect 17: The method of Aspect 16, further comprising determining that the subset of the RRC connection request message repetitions comprises a first subset of a plurality of subsets of RRC connection request message repetitions that are to be used for joint channel estimation, wherein starting the contention resolution timer comprises starting the contention resolution timer based at least in part on determining that the subset of the RRC connection request message repetitions comprises the first subset of the plurality of subsets.

Aspect 18: The method of either of Aspects 16 or 17, further comprising restarting the contention resolution timer at an end of an additional subset of RRC connection request message repetitions that are to be used for joint channel estimation.

Aspect 19: The method of any of Aspects 16-18, further comprising restarting the contention resolution timer at an end of each of a plurality of subsets of RRC connection request message repetitions that are to be used for joint channel estimation.

Aspect 20: The method of any of Aspects 16-19, further comprising receiving a timer start indication that indicates a start time for the contention resolution timer, wherein starting the contention resolution timer comprises starting the contention resolution timer based at least in part on the timer start indication.

Aspect 21: The method of Aspect 20, wherein receiving the timer start indication comprises receiving a system information block that includes the timer start indication.

Aspect 22: The method of either of Aspects 20 or 21, wherein receiving the timer start indication comprises receiving a random access response that includes the timer start indication.

Aspect 23: The method of any of Aspects 16-22, further comprising determining a start time for the contention resolution timer, wherein starting the contention resolution timer comprises starting the contention resolution timer based at least in part on the start time.

Aspect 24: The method of Aspect 23, wherein determining the start time comprises determining the start time based at least in part on at least one parameter.

Aspect 25: The method of either of Aspects 23 or 24, further comprising receiving an indication of a joint channel estimation procedure, wherein determining the start time comprises determining the start time based at least in part on the indication of the joint channel estimation procedure.

Aspect 26: The method of any of Aspects 23-25, wherein determining the start time comprises determining the start time based at least in part on at least one of an indication of frequency hopping or an indication of a frequency hopping parameter.

Aspect 27: The method of Aspect 26, wherein the frequency hopping parameter indicates a number of RRC connection request message repetitions that are transmitted on a frequency resource.

Aspect 28: The method of any of Aspects 1-27, further comprising: determining a time interval corresponding to the repetition procedure; and starting a contention resolution timer after a last RRC connection request message of the repetition procedure.

Aspect 29: The method of Aspect 28, further comprising determining a monitoring window defined within the time interval corresponding to the repetition procedure, wherein starting the contention resolution timer comprises starting the contention resolution timer during the monitoring window.

Aspect 30: The method of Aspect 29, wherein determining the monitoring window comprises determining at least one monitoring window parameter.

Aspect 31: The method of Aspect 30, wherein the at least one monitoring window parameter comprises at least one of: a start time of the monitoring window, or a duration of the monitoring window.

Aspect 32: The method of any of Aspects 29-31, wherein determining the monitoring window comprises receiving a monitoring window indication that indicates at least one monitoring window parameter.

Aspect 33: The method of Aspect 32, wherein receiving the monitoring window indication comprises receiving a system information block that includes the monitoring window indication.

Aspect 34: The method of any of Aspects 29-33, wherein determining the monitoring window comprises determining the monitoring window based at least in part on at least one parameter.

Aspect 35: The method of Aspect 34, further comprising receiving an indication of the at least one parameter.

Aspect 36: The method of either of Aspects 34 or 35, wherein the at least one parameter indicates at least one of: a number of repetitions associated with a demodulation reference signal (DMRS) bundling operation, or a length of a bundling time window associated with the DMRS bundling operation.

Aspect 37: The method of any of Aspects 29-36, wherein determining the monitoring window comprises determining the monitoring window based at least in part on at least one of an indication of frequency hopping or an indication of a frequency hopping parameter.

Aspect 38: The method of any of Aspects 1-37, further comprising refraining from receiving a physical downlink control channel (PDCCH) transmission that schedules an RRC connection setup message.

Aspect 39: The method of Aspect 38, further comprising receiving the RRC connection setup message after a last RRC connection request message repetition associated with the repetition procedure.

Aspect 40: The method of any of Aspects 1-39, wherein invoking the activity state comprises invoking the activity state comprises invoking the activity state based at least in part on at least one UE capability associated with joint channel estimation.

Aspect 41: The method of Aspect 40, wherein the at least one UE capability associated with joint channel estimation comprises at least one UE capability for phase continuity.

Aspect 42: A method of wireless communication performed by a network node, comprising: transmitting an indication of an activity state invocation parameter that comprises an indication to invoke an activity state of a radio resource control (RRC) connection setup message PDCCH monitoring procedure based at least in part on a status of a repetition procedure associated with an RRC connection request message of a four-step random access channel (RACH) procedure; and receiving one or more RRC connection request message repetitions.

Aspect 43: The method of Aspect 42, wherein the indication to invoke the activity state comprises an indication to invoke the activity state based at least in part on a determination that the repetition procedure has started.

Aspect 44: The method of either of Aspects 42 or 43, wherein the indication to invoke the activity state comprises an indication to refrain from monitoring of RRC connection setup message physical downlink control channel (PDCCH) during a time period.

Aspect 45: The method of Aspect 44, wherein the time period comprises a time period between transmission of a first RRC connection request message repetition and transmission of a second RRC connection request message repetition.

Aspect 46: The method of either of Aspects 44 or 45, wherein the time period comprises at least a portion of a time period between transmission of a first RRC connection request message repetition associated with the repetition procedure and a transmission of a last RRC connection request message repetition associated with the repetition procedure.

Aspect 47: The method of any of Aspects 44-46, wherein the indication to refrain from monitoring of the RRC connection setup message PDCCH during the time period comprises an indication to refrain from starting the RRC connection setup message PDCCH monitoring procedure.

Aspect 48: The method of any of Aspects 42-47, wherein the indication to invoke the activity state comprises an indication to invoke the activity state based at least in part on a determination that a subset of RRC connection request message repetitions are to be used for joint channel estimation.

Aspect 49: The method of Aspect 48, further comprising transmitting an indication that the subset of RRC connection request message repetitions are to be used for joint channel estimation, wherein the determination that the subset of RRC connection request message repetitions are to be used for joint channel estimation is based at least in part on the indication that the subset of RRC connection request message repetitions are to be used for joint channel estimation.

Aspect 50: The method of Aspect 49, wherein transmitting the indication comprises transmitting a system information block that includes the indication.

Aspect 51: The method of either of Aspects 49 or 50, wherein transmitting the indication comprises transmitting a random access response that includes the indication.

Aspect 52: The method of any of Aspects 48-51, further comprising transmitting an indication of at least one parameter, wherein the determination that the subset of RRC connection request message repetitions are to be used for joint channel estimation is based at least in part on the at least one parameter.

Aspect 53: The method of Aspect 52, wherein the at least one parameter indicates at least one of: a number of repetitions associated with a demodulation reference signal (DMRS) bundling operation, or a length of a bundling time window associated with the DMRS bundling operation.

Aspect 54: The method of any of Aspects 48-53, further comprising transmitting at least one of an indication of frequency hopping or an indication of a frequency hopping parameter, wherein the determination that the subset of RRC connection request message repetitions are to be used for joint channel estimation is based at least in part on the at least one of the indication of frequency hopping or the indication of the frequency hopping parameter.

Aspect 55: The method of any of Aspects 42-54, further comprising transmitting a timer start indication that indicates a start time for a contention resolution timer.

Aspect 56: The method of Aspect 55, wherein the timer start indication comprises an indication to start the contention resolution timer based at least in part on a determination that the subset of the RRC connection request message repetitions comprises a first subset of a plurality of subsets.

Aspect 57: The method of either of Aspects 55 or 56, wherein the timer start indication comprises an indication to restart the contention resolution timer at an end of an additional subset of RRC connection request message repetitions that are to be used for joint channel estimation.

Aspect 58: The method of any of Aspects 55-57, wherein the timer start indication comprises an indication to restart the contention resolution timer at an end of each of a plurality of subsets of RRC connection request message repetitions that are to be used for joint channel estimation.

Aspect 59: The method of any of Aspects 55-58, wherein transmitting the timer start indication comprises transmitting a system information block that includes the timer start indication.

Aspect 60: The method of any of Aspects 55-59, wherein transmitting the timer start indication comprises transmitting a random access response that includes the timer start indication.

Aspect 61: The method of any of Aspects 55-60, further comprising transmitting an indication of at least one parameter, and wherein the timer start indication comprises an indication to start the contention resolution timer based at least in part on the at least one parameter.

Aspect 62: The method of any of Aspects 55-61, further comprising transmitting an indication of a joint channel estimation procedure, wherein the timer start indication comprises an indication to start the contention resolution timer based at least in part on the joint channel estimation procedure.

Aspect 63: The method of any of Aspects 55-62, further comprising transmitting at least one of an indication of frequency hopping or an indication of a frequency hopping parameter, wherein the timer start indication comprises an indication to start the contention resolution timer based at least in part on the at least one of an indication of frequency hopping or an indication of a frequency hopping parameter.

Aspect 64: The method of Aspect 63, wherein the frequency hopping parameter indicates a number of RRC connection request message repetitions that are transmitted on a frequency resource.

Aspect 65: The method of any of Aspects 55-64, wherein the timer start indication comprises an indication to start a contention resolution timer after a last RRC connection request message of the repetition procedure.

Aspect 66: The method of any of Aspects 55-65, wherein the timer start indication comprises an indication to start the contention resolution timer during a monitoring window defined within a time interval corresponding to the repetition procedure.

Aspect 67: The method of Aspect 66, further comprising transmitting an indication of at least one monitoring window parameter.

Aspect 68: The method of Aspect 67, wherein the at least one monitoring window parameter comprises at least one of: a start time of the monitoring window, or a duration of the monitoring window.

Aspect 69: The method of either of Aspects 67 or 68, wherein transmitting the monitoring window indication comprises transmitting a system information block that includes the monitoring window indication.

Aspect 70: The method of any of Aspects 66-69, further comprising transmitting an indication of at least one parameter, wherein the timer start indication comprises an indication to determine the monitoring window based at least in part on the at least one parameter.

Aspect 71: The method of Aspect 70, wherein the at least one parameter indicates at least one of: a number of repetitions associated with a demodulation reference signal (DMRS) bundling operation, or a length of a bundling time window associated with the DMRS bundling operation.

Aspect 72: The method of any of Aspects 42-71, further comprising transmitting a physical downlink control channel (PDCCH) transmission that schedules an RRC connection setup message.

Aspect 73: The method of Aspect 72, further comprising transmitting the RRC connection setup message after a last RRC connection request message repetition associated with the repetition procedure.

Aspect 74: The method of any of Aspects 42-73, wherein the indication to invoke the activity state comprises an indication to invoke the activity state based at least in part on at least one UE capability associated with joint channel estimation.

Aspect 75: The method of Aspect 74, wherein the at least one UE capability associated with joint channel estimation comprises at least one UE capability for phase continuity.

Aspect 76: An apparatus for wireless communication at a device, comprising a processor; memory coupled with the processor; and instructions stored in the memory and executable by the processor to cause the apparatus to perform the method of one or more of Aspects 1-41.

Aspect 77: A device for wireless communication, comprising a memory and one or more processors coupled to the memory, the one or more processors configured to perform the method of one or more of Aspects 1-41.

Aspect 78: An apparatus for wireless communication, comprising at least one means for performing the method of one or more of Aspects 1-41.

Aspect 79: A non-transitory computer-readable medium storing code for wireless communication, the code comprising instructions executable by a processor to perform the method of one or more of Aspects 1-41.

Aspect 80: A non-transitory computer-readable medium storing a set of instructions for wireless communication, the set of instructions comprising one or more instructions that, when executed by one or more processors of a device, cause the device to perform the method of one or more of Aspects 1-41.

Aspect 81: An apparatus for wireless communication at a device, comprising a processor; memory coupled with the processor; and instructions stored in the memory and executable by the processor to cause the apparatus to perform the method of one or more of Aspects 42-75.

Aspect 82: A device for wireless communication, comprising a memory and one or more processors coupled to the memory, the one or more processors configured to perform the method of one or more of Aspects 42-75.

Aspect 83: An apparatus for wireless communication, comprising at least one means for performing the method of one or more of Aspects 42-75.

Aspect 84: A non-transitory computer-readable medium storing code for wireless communication, the code comprising instructions executable by a processor to perform the method of one or more of Aspects 42-75.

Aspect 85: A non-transitory computer-readable medium storing a set of instructions for wireless communication, the set of instructions comprising one or more instructions that, when executed by one or more processors of a device, cause the device to perform the method of one or more of Aspects 42-75.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   memory; and
   one or more processors coupled with the memory and configured to:
   determine a status of a repetition procedure associated with a radio resource control (RRC) connection request message of a four-step random access channel (RACH) procedure;
   determine that a subset of RRC connection request message repetitions are to be used for joint channel estimation; and
   invoke an activity state of an RRC connection setup message physical downlink control channel (PDCCH) monitoring procedure based at least in part on the status of the repetition procedure, wherein the one or more processors are configured to invoke the activity state based at least in part on determining that the subset of RRC connection request message repetitions are to be used for joint channel estimation.

2. The UE of claim 1, wherein the one or more processors, to determine the status of the repetition procedure, are configured to determine that the repetition procedure has started.

3. The UE of claim 1, wherein the one or more processors, to invoke the activity state, are configured to refrain from monitoring of RRC connection setup message PDCCH during a time period.

4. The UE of claim 3, wherein the time period comprises a time period between transmission of a first RRC connection request message repetition and transmission of a second RRC connection request message repetition.

5. The UE of claim 3, wherein the time period comprises at least a portion of a time period between transmission of a first RRC connection request message repetition associated with the repetition procedure and a transmission of a last RRC connection request message repetition associated with the repetition procedure.

6. The UE of claim 3, wherein the one or more processors, to refrain from monitoring of the RRC connection setup message PDCCH during the time period, are configured to refrain from starting the RRC connection setup message PDCCH monitoring procedure.

7. The UE of claim 1, wherein the one or more processors, to determine that the subset of RRC connection request message repetitions are to be used for joint channel estimation, are configured to receive an indication that the subset of RRC connection request message repetitions are to be used for joint channel estimation.

8. The UE of claim 7, wherein the one or more processors, to receive the indication, are configured to receive at least one of:
   a system information block that includes the indication, or
   a random access response that includes the indication.

9. The UE of claim 1, wherein the one or more processors are further configured to receive an indication of at least one parameter, and wherein the one or more processors, to determine that the subset of RRC connection request message repetitions are to be used for joint channel estimation, are configured to determine that the subset of RRC connection request message repetitions are to be used for joint channel estimation based at least in part on the at least one parameter.

10. The UE of claim 9, wherein the at least one parameter indicates at least one of:
    a number of repetitions associated with a demodulation reference signal (DMRS) bundling operation, or
    a length of a bundling time window associated with the DMRS bundling operation.

11. The UE of claim 1, wherein the one or more processors, to determine that the subset of RRC connection request message repetitions are to be used for joint channel estimation, are configured to determine that the subset of RRC connection request message repetitions are to be used for joint channel estimation based at least in part on at least one of an indication of frequency hopping or an indication of a frequency hopping parameter.

12. The UE of claim 1, wherein the one or more processors are further configured to start a contention resolution timer at an end of the subset of RRC connection request message repetitions.

13. The UE of claim 12, wherein the one or more processors are further configured to determine that the subset of RRC connection request message repetitions comprises a first subset of a plurality of subsets of RRC connection request message repetitions that are to be used for joint channel estimation, and wherein the one or more processors, to start the contention resolution timer, are configured to start the contention resolution timer based at least in part on determining that the subset of RRC connection request message repetitions comprises the first subset of the plurality of subsets.

14. The UE of claim 12, wherein the one or more processors are further configured to restart the contention resolution timer at an end of at least one additional subset of RRC connection request message repetitions that are to be used for joint channel estimation.

15. The UE of claim 12, wherein the one or more processors are further configured to receive a timer start indication that indicates a start time for the contention resolution timer, and wherein the one or more processors, to start the contention resolution timer, are configured to start the contention resolution timer based at least in part on the timer start indication.

16. The UE of claim 15, wherein the one or more processors, to receive the timer start indication, are configured to receive at least one of:
    a system information block that includes the timer start indication, or
    a random access response that includes the timer start indication.

17. The UE of claim 15, wherein the one or more processors are further configured to determine a start time for the contention resolution timer, and wherein the one or more processors, to start the contention resolution timer, are configured to start the contention resolution timer based at least in part on the start time.

18. The UE of claim 17, wherein the one or more processors, to determine the start time, are configured to determine the start time based at least in part on at least one parameter.

19. The UE of claim 17, wherein the one or more processors are further configured to receive an indication of a joint channel estimation procedure, and wherein the one or more processors, to determine the start time, are configured to determine the start time based at least in part on the indication of the joint channel estimation procedure.

20. The UE of claim 17, wherein the one or more processors, to determine the start time, are configured to determine the start time based at least in part on at least one of an indication of frequency hopping or an indication of a frequency hopping parameter.

21. The UE of claim 20, wherein the frequency hopping parameter indicates a number of RRC connection request message repetitions that are transmitted on a frequency resource.

22. The UE of claim 1, wherein the one or more processors are further configured to:
    determine a monitoring window defined within a time interval corresponding to the repetition procedure; and
    start a contention resolution timer during the monitoring window.

23. The UE of claim 22, wherein the one or more processors, to determine the monitoring window, are configured to receive a monitoring window indication that indicates at least one monitoring window parameter.

24. The UE of claim 1, wherein the one or more processors are further configured to:
    refrain from receiving a PDCCH transmission that schedules an RRC connection setup message; and
    receive the RRC connection setup message after a last RRC connection request message repetition associated with the repetition procedure.

25. The UE of claim 1, wherein the one or more processors, to invoke the activity state, are configured to invoke the activity state based at least in part on at least one UE capability associated with joint channel estimation.

26. The UE of claim 25, wherein the at least one UE capability associated with joint channel estimation comprises at least one UE capability for phase continuity.

27. A network node for wireless communication, comprising:
    memory; and
    one or more processors coupled with the memory and configured to:
    transmit an indication of an activity state invocation parameter that comprises an indication to invoke an activity state of a radio resource control (RRC) connection setup message physical downlink control channel (PDCCH) monitoring procedure based at least in part on a status of a repetition procedure associated with an RRC connection request message of a four-step random access channel (RACH) procedure, wherein the indication to invoke the activity state comprises an indication to invoke the activity state based at least in part on a determination that a subset of RRC connection request message repetitions are to be used for joint channel estimation; and
    receive one or more RRC connection request message repetitions.

28. The network node of claim 27, wherein the indication to invoke the activity state comprises an indication to refrain from monitoring of RRC connection setup message physical downlink control channel (PDCCH) during a time period;
    wherein the time period comprises:
        a time period between transmission of a first RRC connection request message repetition and transmission of a second RRC connection request message repetition; or
        at least a portion of a time period between transmission of a first RRC connection request message repetition associated with the repetition procedure and a transmission of a last RRC connection request message repetition associated with the repetition procedure;
    wherein the one or more processors are further configured to transmit an indication that the subset of RRC connection request message repetitions are to be used for joint channel estimation, and wherein the determination that the subset of RRC connection request message repetitions are to be used for joint channel estimation is based at least in part on the indication that the subset of RRC connection request message repetitions are to be used for joint channel estimation.

29. A method of wireless communication performed by a user equipment (UE), comprising:
    determining a status of a repetition procedure associated with a radio resource control (RRC) connection request message of a four-step random access channel (RACH) procedure;
    determining that a subset of RRC connection request message repetitions are to be used for joint channel estimation; and
    invoking an activity state of an RRC connection setup message physical downlink control channel monitoring procedure based at least in part on the status of the repetition procedure, wherein invoking the activity state comprises invoking the activity state based at least in part on determining that the subset of RRC connection request message repetitions are to be used for joint channel estimation.

30. A method of wireless communication performed by a network node, comprising:

transmitting an indication of an activity state invocation parameter that comprises an indication to invoke an activity state of a radio resource control (RRC) connection setup message physical downlink control channel monitoring procedure based at least in part on a status of a repetition procedure associated with an RRC connection request message of a four-step random access channel (RACH) procedure, wherein the indication to invoke the activity state comprises an indication to invoke the activity state based at least in part on a determination that a subset of RRC connection request message repetitions are to be used for joint channel estimation; and receiving one or more RRC connection request message repetitions.

* * * * *